(12) United States Patent
Goodwin et al.

(10) Patent No.: US 11,110,634 B2
(45) Date of Patent: Sep. 7, 2021

(54) METHOD AND APPARATUS FOR MAKING A POLYMERIC AIRCRAFT WINDOW PANEL

(71) Applicant: PPG Industries Ohio, Inc., Cleveland, OH (US)

(72) Inventors: George B. Goodwin, Cranberry Township, PA (US); Dennis P. McCarthy, Owens Cross Roads, AL (US); John D. M. Shearer, Cheswick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 485 days.

(21) Appl. No.: 15/291,153

(22) Filed: Oct. 12, 2016

(65) Prior Publication Data

US 2017/0100865 A1   Apr. 13, 2017

Related U.S. Application Data

(60) Provisional application No. 62/240,060, filed on Oct. 12, 2015.

(51) Int. Cl.
| | |
|---|---|
| *B29C 45/26* | (2006.01) |
| *B29C 45/14* | (2006.01) |
| *B29C 33/38* | (2006.01) |
| *B29C 33/34* | (2006.01) |
| *B29C 33/56* | (2006.01) |

(Continued)

(52) U.S. Cl.
CPC ........ *B29C 45/14065* (2013.01); *B29C 33/34* (2013.01); *B29C 33/38* (2013.01); *B29C 33/565* (2013.01); *B29C 45/0046* (2013.01); *B29C 45/20* (2013.01); *B29C 45/2608* (2013.01); *B29C 45/37* (2013.01); *B29C 45/641* (2013.01); *B29C 2791/005* (2013.01); *B29K 2105/20* (2013.01); *B29K 2905/00* (2013.01); *B29K 2905/02* (2013.01); *B29K 2905/12* (2013.01); *B29K 2909/08* (2013.01); *B29K 2995/0026* (2013.01); *B29L 2031/3076* (2013.01);

(Continued)

(58) Field of Classification Search
CPC ............... B64C 1/1484; B64C 1/1492; B29C 45/14065; B29C 45/20; B29C 45/2608; B29K 2105/20
See application file for complete search history.

(56) References Cited

U.S. PATENT DOCUMENTS

| | | |
|---|---|---|
| 2,253,697 A | 8/1941 | Genesy |
| 2,581,939 A | 1/1952 | Deist et al. |

(Continued)

FOREIGN PATENT DOCUMENTS

| | | |
|---|---|---|
| AU | 597782 | 6/1990 |
| CN | 102990866 A | 3/2013 |

(Continued)

*Primary Examiner* — Ryan M Ochylski
(74) *Attorney, Agent, or Firm* — Neil J. Friedrich

(57) ABSTRACT

A mold for casting a polymeric aircraft window panel includes a first mold half (12) having a first mold surface (24), and a second mold half (14) having a second mold surface (50). The first mold surface (24) and/or the second mold surface (50) have a shape conforming to a final shape for the major surfaces of the aircraft window panel. The first mold half (12) and/or the second mold half (14) can be formed of rolled, hydroformed, or stamped metal.

20 Claims, 17 Drawing Sheets

(51) Int. Cl.
  *B29C 45/37*   (2006.01)
  *B29C 45/00*   (2006.01)
  *B29C 45/20*   (2006.01)
  *B29C 45/64*   (2006.01)
  *B64C 1/14*   (2006.01)
  *B29L 31/00*   (2006.01)
  *B29K 105/20*   (2006.01)
  *B29L 31/30*   (2006.01)

(52) U.S. Cl.
  CPC . *B29L 2031/778* (2013.01); *B29L 2031/7782* (2013.01); *B64C 1/1484* (2013.01)

(56) References Cited

U.S. PATENT DOCUMENTS

| | | | |
|---|---|---|---|
| 3,056,166 | A * | 10/1962 | Weinberg ............ B29C 33/0038 249/102 |
| 3,689,022 | A | 9/1972 | Rossetti |
| 4,325,688 | A | 4/1982 | Kumasaka et al. |
| 4,573,903 | A | 3/1986 | Boudet et al. |
| 5,034,166 | A | 7/1991 | Rawlings et al. |
| 5,051,226 | A | 9/1991 | Brustad et al. |
| 6,241,304 | B1 * | 6/2001 | Frost ................ B60J 10/70 296/146.15 |
| 6,304,794 | B1 * | 10/2001 | Nishimine .......... B29C 33/3835 164/169 |
| 6,565,776 | B1 | 5/2003 | Li et al. |
| 2002/0113168 | A1 * | 8/2002 | Rukavina ............. B64C 1/1492 244/129.3 |
| 2003/0011104 | A1 | 1/2003 | Hock et al. |
| 2006/0080914 | A1 | 4/2006 | Wood et al. |
| 2008/0026239 | A1 | 1/2008 | Balboni et al. |
| 2009/0171059 | A1 * | 7/2009 | Gerkin ................... C08G 18/10 528/67 |
| 2010/0127411 | A1 | 5/2010 | Kadota et al. |
| 2011/0062613 | A1 | 3/2011 | Haraguchi et al. |
| 2011/0108667 | A1 * | 5/2011 | Keller .................. B29C 51/082 244/119 |
| 2014/0035176 | A1 * | 2/2014 | Hamilton ......... B29D 11/00567 264/2.2 |
| 2014/0083049 | A1 * | 3/2014 | Ruggie ................... B29C 33/00 52/784.1 |
| 2015/0144233 | A1 | 5/2015 | Park et al. |
| 2015/0224676 | A1 | 8/2015 | Davies et al. |

FOREIGN PATENT DOCUMENTS

| | | | |
|---|---|---|---|
| DE | 2927429 A1 | 1/1981 | |
| DE | 102007022327 A1 | 11/2008 | |
| GB | 2051397 A | 1/1981 | |
| GB | 2104824 A * | 3/1983 | ........ B29D 11/00596 |
| GB | 2141967 A | 1/1985 | |
| JP | S52144260 A | 12/1977 | |
| JP | S54152067 A | 11/1979 | |
| JP | S5933122 A | 2/1984 | |
| JP | 6152939 A | 3/1986 | |
| JP | H0263705 A | 3/1990 | |
| JP | 4107011 U | 9/1992 | |
| JP | H04107011 U | 9/1992 | |
| JP | 5269758 A | 10/1993 | |
| JP | 2004291606 A | 10/2004 | |
| JP | 2005203032 A * | 7/2005 | |
| JP | 2009285943 A | 12/2009 | |
| JP | 2011145513 A | 7/2011 | |
| WO | 0076738 A1 | 12/2000 | |
| WO | 2005090041 A2 | 9/2005 | |
| WO | 2015069339 A2 | 5/2015 | |

* cited by examiner

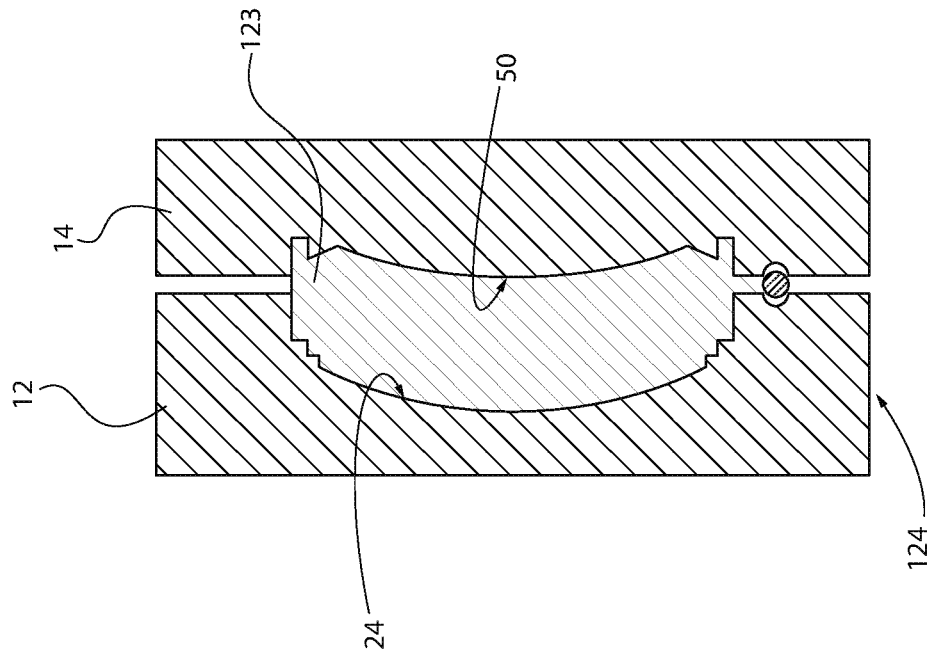
FIG. 14B
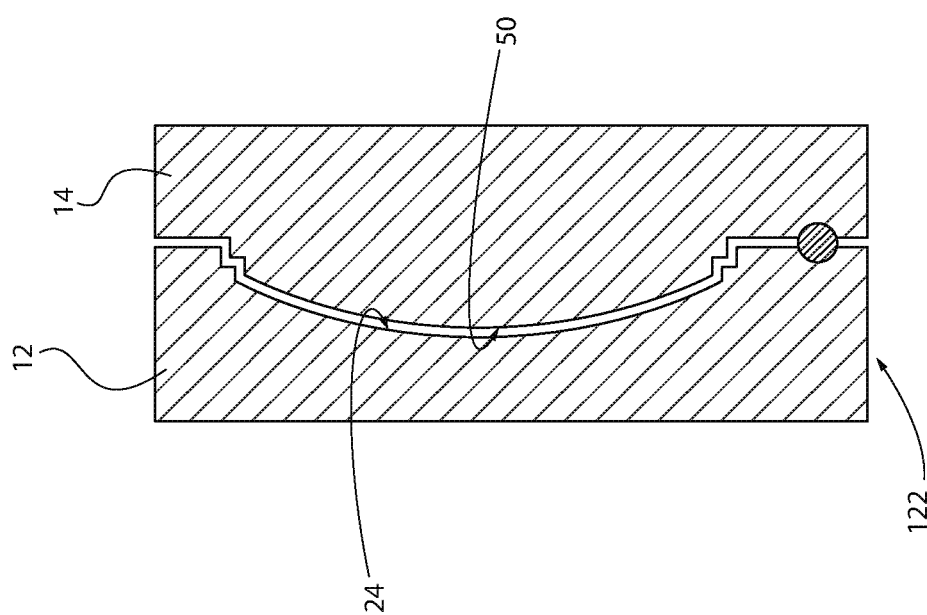
FIG. 14A
FIG. 14

METHOD AND APPARATUS FOR MAKING A POLYMERIC AIRCRAFT WINDOW PANEL

CROSS-REFERENCE TO RELATED APPLICATION

This application claims priority to U.S. Provisional Application No. 62/240,060, filed Oct. 12, 2015, which is herein incorporated by reference in its entirety.

BACKGROUND OF THE INVENTION

Field of the Invention

This invention relates generally aircraft windows and, more particularly, to methods and apparatuses for casting aircraft window panels having a desired final shape.

Technical Considerations

Modern aircraft windows typically include one or more shaped or contoured panels. The aircraft window typically has a first panel with contoured major surfaces spaced from a second panel with contoured major surfaces. The window panels include peripheries with specially designed complex shapes configured to engage a window frame. For example, the peripheries can have rabbited or stepped edges that engage channels in the frame. The first and/or second window panels may include other physical features, such as holes to allow for pressure equalization during aircraft flight.

Many modern aircraft windows incorporate polymeric window panels, typically acrylic window panels, rather than the glass window panels, which were common in the past. Although glass is stronger than acrylic, glass is also heavier, which increases the weight of the aircraft and decreases fuel efficiency. However, while acrylic is lighter than glass, the process for making an acrylic aircraft window panel having the complex surface contours and/or complex edge peripheries and/or other physical features needed for a modern aircraft window panel is a challenge.

Currently, an acrylic window panel is made by forming a solid, rectangular acrylic sheet in a heavy, fixed-space mold. The acrylic sheet then must undergo several cutting, machining, drilling and polishing steps to create a window panel having the required shape and other features. For example, the major surfaces of the acrylic sheet must be cut, ground, and/or polished to a desired final shape, e.g., surface contour. By "final shape" is meant the shape (e.g., surface contour) of the window panel to be installed in the aircraft window frame to produce the aircraft window. The peripheral edges of the acrylic sheet must be cut to the desired complex shapes to engage the frame channels. Other required physical features also must be fabricated. For example, the pressure equalization holes must be drilled through the acrylic sheet.

These processing steps are time consuming. They also require sophisticated cutting and polishing machinery that must be accurately controlled to provide an aircraft window panel having the desired final shape. This process is even more difficult if the aircraft window panel is designed to have structurally complex edge regions (for example, rabbited or stepped edges to engage channels in a window frame) or to have complex final surface contours or to have surface regions of differing contours. Additionally, these processing steps can create tool marks on the window panel surfaces. The tool marks must be polished out or they can adversely affect the visible light transmittance through the window panel and/or be aesthetically displeasing.

Another problem with conventional polymeric aircraft window panel production is that the molds used in the acrylic molding process are typically heavy, fixed-space molds. These molds are cumbersome to use due to their size and/or weight. The molds are also expensive to fabricate and maintain.

Therefore, it would be desirable to provide a method and/or apparatus for making an aircraft window panel that reduces or eliminates at least some of the problems associated with conventional polymeric aircraft window panel manufacturing methods. For example, it would be desirable to provide a method and/or apparatus for making a polymeric aircraft window panel that eliminates at least some of the processing steps currently required to make a polymeric aircraft window panel. For example, it would be desirable to provide an aircraft window panel manufacturing process that does not require the heavy and expensive fixed-space molds used for conventional acrylic aircraft window panel production. For example, it would be advantageous to provide a method and/or apparatus for casting an aircraft window panel to a desired final shape (e.g., final surface contours and/or final edge configuration and/or final physical features) without the need for additional cutting and shaping steps or at least reducing the number of such steps needed. For example, it would be advantageous to provide a method and/or apparatus for casting an aircraft window panel to a desired final shape with less risk of leaving tool marks on the aircraft window panel.

SUMMARY OF THE INVENTION

A mold for casting a polymeric aircraft window panel comprises a first mold half comprising a first mold surface, and a second mold half comprising a second mold surface. The first mold surface and/or the second mold surface have a shape conforming to a final shape for the major surfaces of the aircraft window panel.

The first mold half and/or the second mold half can be formed of rolled, hydroformed, or stamped metal.

The first mold surface and/or the second mold surface can be formed of rolled, hydroformed, or stamped metal.

A mold for casting a polymeric aircraft window panel comprises a rolled, hydroformed, or stamped metal first mold half and a rolled, hydroformed, or stamped metal second mold half.

A mold for casting a polymeric aircraft window panel comprises a first mold half and a second mold half. The mold halves comprise a material selected from the group consisting of glass, ceramic, carbon fiber, silicone, nylon, and high temperature plastics.

A casting assembly for casting a polymeric aircraft window panel comprises a mold comprising a rolled, hydroformed, or stamped metal first mold half and a rolled, hydroformed, or stamped metal second mold half. The assembly further comprises a fluid bath configured to receive the mold and a recirculating heater in flow communication with the fluid bath.

A casting assembly for casting a polymeric aircraft window panel comprises a plurality of molds. The molds comprise a rolled, hydroformed, or stamped metal first mold half and a rolled, hydroformed, or stamped metal second mold half. The assembly further comprises a heating chamber and a plurality of conveyors extending through the heating chamber.

A method of casting a polymeric aircraft window panel comprises the steps of: injecting a polymer precursor liquid into a mold chamber of a mold, the mold comprising a first mold half comprising a first mold surface having a first shape and a second mold half comprising a second mold surface having a second shape; and curing the polymer precursor liquid to form an aircraft window panel. The aircraft window panel has a first surface corresponding to the first shape and a second surface corresponding to the second shape.

A method of casting a polymeric aircraft window panel comprises the steps of: injecting a polymer precursor liquid into a mold chamber of a mold comprising a rolled, hydroformed, or stamped metal first mold half and a rolled, hydroformed, or stamped metal second mold half; and curing the polymer precursor liquid to form an aircraft window panel.

A method of casting a polymeric aircraft window panel comprises the steps of: connecting a rolled, hydroformed, or stamped metal first mold half and a rolled, hydroformed, or stamped metal second mold half to form a mold having a mold chamber; preheating the mold to a temperature in the range of 250° F. to 275° F.; optionally placing the mold at an inclined angle; optionally placing the mold in a fluid bath; injecting a polymer precursor liquid into the mold chamber; heating the mold to cure the polymer precursor liquid; cooling the mold; disconnecting the first and second mold halves; and removing the aircraft window panel.

A method of casting a polymeric aircraft window panel comprises the steps of: connecting a first mold half and a second mold half to form a mold having a mold chamber, wherein first mold half comprises a first mold surface having a first shape and the second mold half comprises a second mold surface having a second shape; preheating the mold to a temperature in the range of 250° F. to 275° F.; optionally placing the mold at an inclined angle; optionally placing the mold in a fluid bath; injecting a polymer precursor liquid into the mold chamber; heating the mold to cure the polymer precursor liquid; cooling the mold; disconnecting the first and second mold halves; and removing the aircraft window panel. The aircraft window panel has a first surface corresponding to the first shape and a second surface corresponding to the second shape.

A method of casting a polymeric aircraft window panel comprises injecting a polymer precursor liquid into a mold chamber of a mold comprising a rolled, hydroformed, or stamped metal first mold half having a deformable first mold surface and a rolled, hydroformed, or stamped metal second mold half having a deformable second mold surface, wherein the first mold surface and second mold surface deform from a first shape before injection of a polymer precursor liquid into the mold to a second shape after injection of a polymer precursor liquid into the mold, and wherein the second shape conforms to a desired final shape of the window panel.

A method of casting a polymeric laminate comprises the steps of: injecting a urethane polymer precursor liquid into a mold chamber of a mold comprising a polymeric first mold half and a polymeric second mold half; and curing the polymer precursor liquid to form a laminated polymeric structure.

BRIEF DESCRIPTION OF THE DRAWINGS

The invention will be described with reference to the following drawing figures wherein like reference characters identify like parts throughout.

FIG. 14 illustrates a mold of the invention having deformable mold surfaces;

DESCRIPTION OF THE INVENTION

Figure 1:
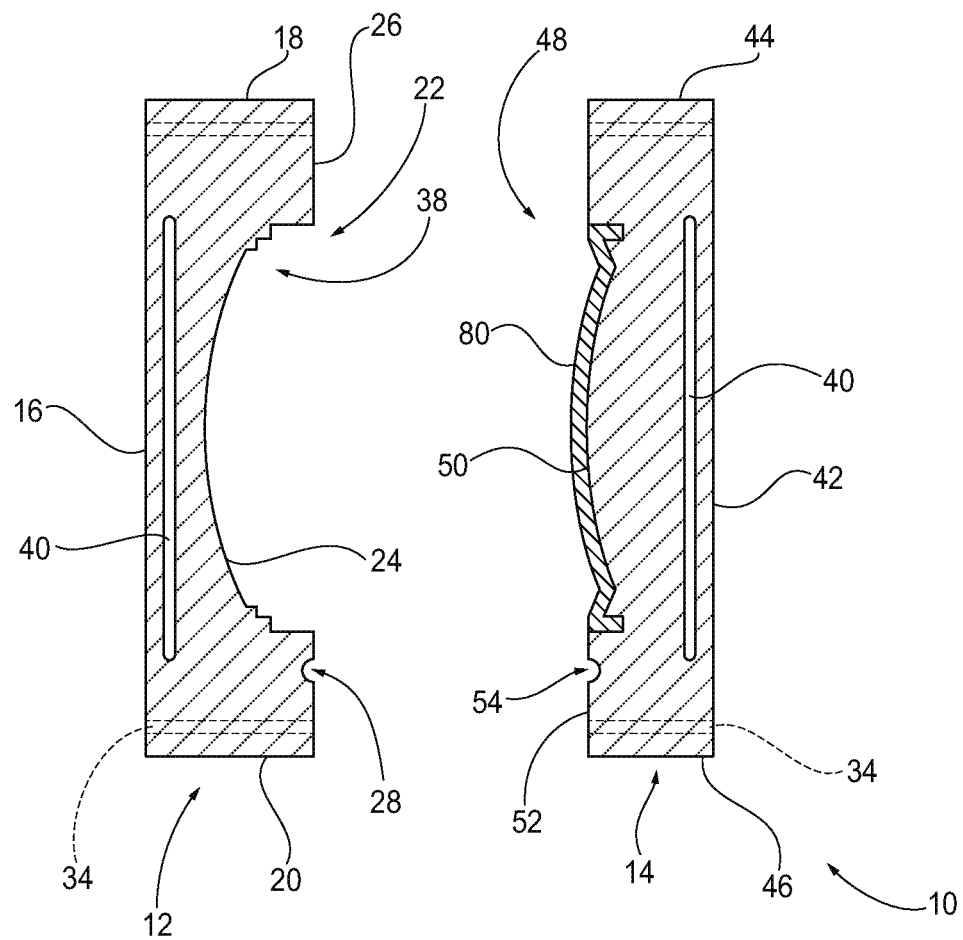
FIG. 1 is side, sectional view of a mold of the invention having two spaced mold halves.

As used in the specification and the claims, the singular form of "a", "an", and "the" include plural referents, unless the context clearly dictates otherwise.

Spatial or directional terms, such as "left", "right", "up", "down", "inner", "outer", and the like, relate to the invention as it is shown in the drawing figures. However, the invention can assume various alternative orientations and, accordingly, such terms are not to be considered as limiting.

All numbers used in the specification and claims are to be understood as being modified in all instances by the term "about". By "about" is meant a range of plus or minus ten percent of the stated value.

The term "such as" is to be understood as being non-limiting. That is, the elements recited after "such as" are to be understood as being non-limiting examples of the recited features.

All ranges disclosed herein encompass the beginning and ending range values and any and all subranges subsumed therein. The ranges disclosed herein represent the average values over the specified range.

The term "film" refers to a region of a coating or layer having a uniform composition. A "layer" comprises one or more "films". A "coating" comprises one or more "layers".

The term "over" means "farther from the substrate". For example, a second layer located "over" a first layer means that the second layer is located farther from the substrate than the first layer. The second layer can be in direct contact with the first layer or one or more other layers can be located between the second layer and the first layer.

The term "metal" includes conventionally recognized metals and also silicon.

The terms "polymer" or "polymeric" include oligomers, homopolymers, copolymers, and terpolymers, e.g., polymers formed from two or more types of monomers or polymers.

All documents referred to herein are "incorporated by reference" in their entirety.

By "at least" is meant "greater than or equal to". By "not greater than" is meant "less than or equal to".

The term "includes" is synonymous with "comprises".

When referring to different conditions, the terms "first", "second", etc., are not intended to refer to any particular order or chronology but instead refer to different positions, conditions, or properties.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of, the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

Figure 2:
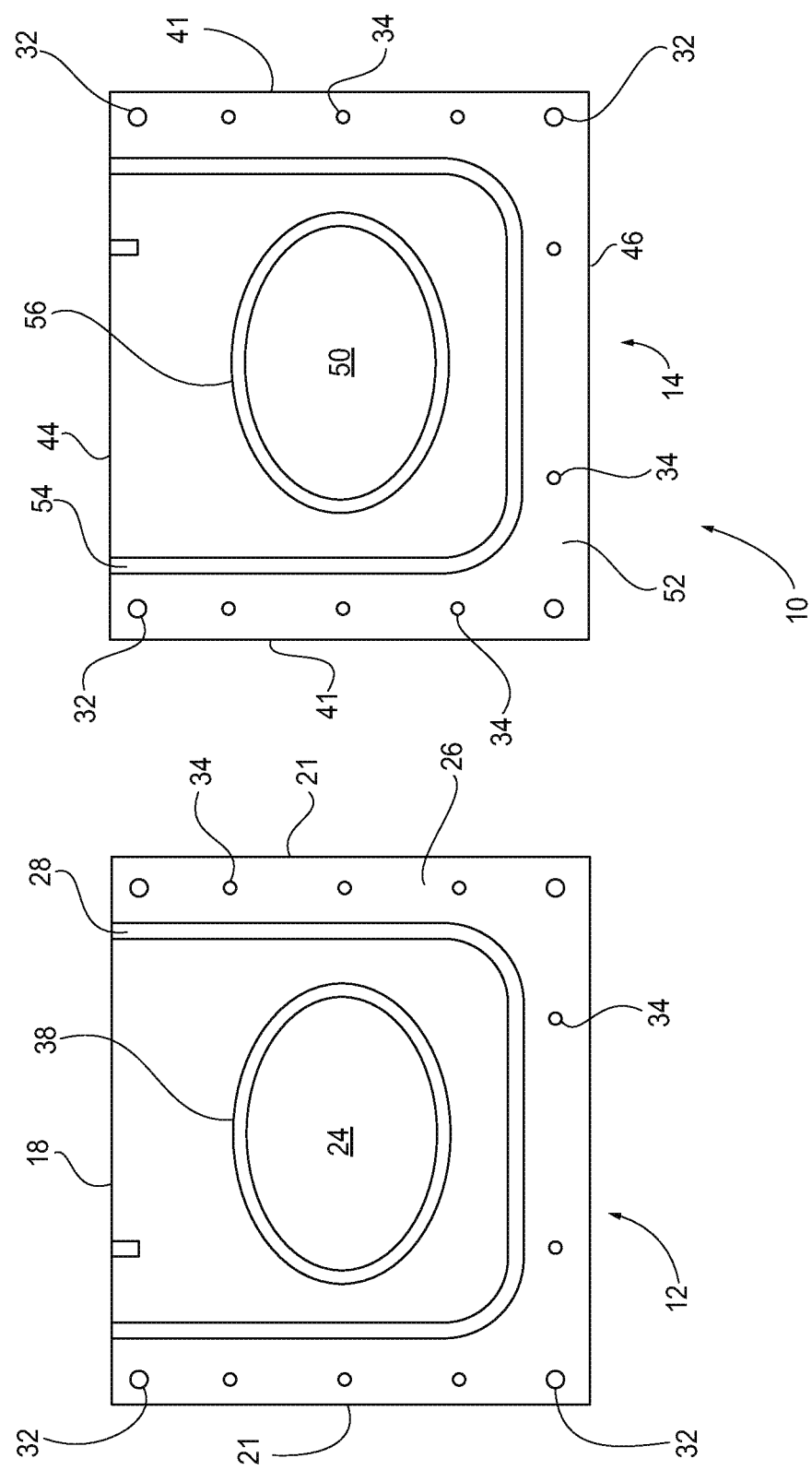
FIG. 2 is a front view of the interior surfaces of the mold halves of FIG. 1.
Figure 3:
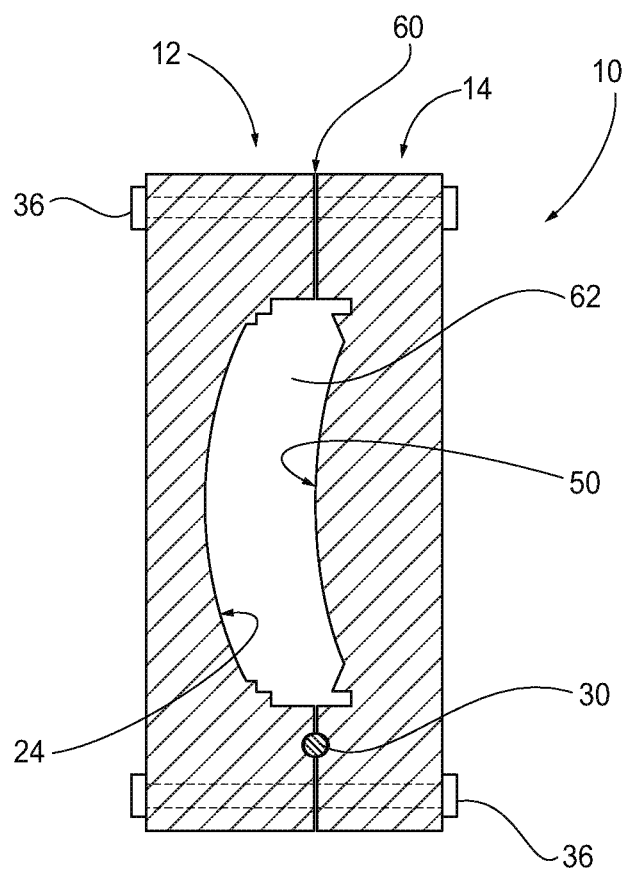
FIG. 3 is a side, sectional view of the mold of FIG. 1 with the mold halves connected.

FIGS. 1 to 3 illustrate a mold 10 of the invention. The mold 10 has a first mold half 12 spaced from a second mold half 14. The first mold half 12 has a back 16, a top 18, a bottom 20, a pair of opposed sides 21, and a front 22. The first mold half 12 includes a first mold surface 24. A flange 26 surrounds and/or extends outwardly from the first mold surface 24. The front 22 of the first mold half 12 includes a gasket track 28 configured to receive a gasket 30 (see FIG. 3). As shown in FIG. 2, the first mold half 12 may include one or more alignment bores 32 to facilitate alignment of the first mold half 12 and second mold half 14 during the casting process. The first mold half 12 may include fastener holes 34 to receive fasteners 36, such as threaded bolts, to secure the first mold half 12 to the second mold half 14 during the casting process. The first mold half 12 may include a lip 38 surrounding the first mold surface 24. The first mold half 12 may include a heating element 40. For example, the heating element 40 can be an electric heating coil connected to or embedded in the first mold half 12.

Unlike the conventional molds currently used to make polymeric aircraft windows, the first mold surface 24 is configured to provide a cast aircraft window panel having a surface (e.g., first surface) with a desired final shape without the need for additional cutting or machining steps. By "final shape" is meant the shape (e.g., surface contour and/or edge contour) of the window panel to be installed in an aircraft window frame to form an aircraft window for installation in an aircraft at ground level. For example, for initial installation of the aircraft windows during building of the aircraft or to replace a damaged window in the aircraft. As will be appreciated, an aircraft window can undergo changes in shape during flight. For example, the aircraft window can flex or bow due to changes between the interior and exterior pressures on the window. When the aircraft lands, the window should return to its final shape.

The first mold surface 24 has a shape conforming to a predetermined final shape for an aircraft window panel surface. The first mold surface 24 can be a rigid surface having a curvature conforming to the desired final shape of a surface of the aircraft window panel. Optionally, the first mold surface 24 can be a deformable surface capable of moving between a first shape and a second shape during the molding process, with the second shape conforming to the desired curvature of the aircraft window panel surface.

The second mold half 14 has a back 42, a top 44, a bottom 46, a pair of opposed sides 41, and a front 48. The second mold half 14 includes a second mold surface 50. A flange 52 surrounds the second mold surface 50. The front 48 of the second mold half 14 includes a gasket track 54. The second mold half 14 may include one or more alignment bores 32 and/or fastener holes 34, as described above. The second mold half 14 may include a second lip 56 surrounding the second mold surface 50. The second mold half 14 may include a heating element 40 as described above.

Unlike the conventional molds currently used to make polymeric aircraft windows, the second mold surface 50 is configured to provide an aircraft window panel having a surface (e.g., second surface) with a desired final shape without the need for additional cutting or machining steps. The second mold surface 50 has a shape conforming to a predetermined final shape of an aircraft window panel surface. The second mold surface 50 can be a rigid surface having a curvature conforming to the desired curvature of a surface of the aircraft window panel. Optionally, the second mold surface 50 can be a deformable surface capable of moving between a first shape and a second shape during the molding process, with the second shape conforming to the desired curvature of the surface of the aircraft window panel. The first mold surface 24 and the second mold surface 50 work in concert to provide the desired final shape.

As shown in FIG. 3, the first mold half 12 can be connected to the second mold half 14 to define the mold 10. The mold 10 has an inlet 60 and a mold chamber 62. The mold chamber 62 is formed between the opposed first mold surface 24 and second mold surface 50.

Figure 4:
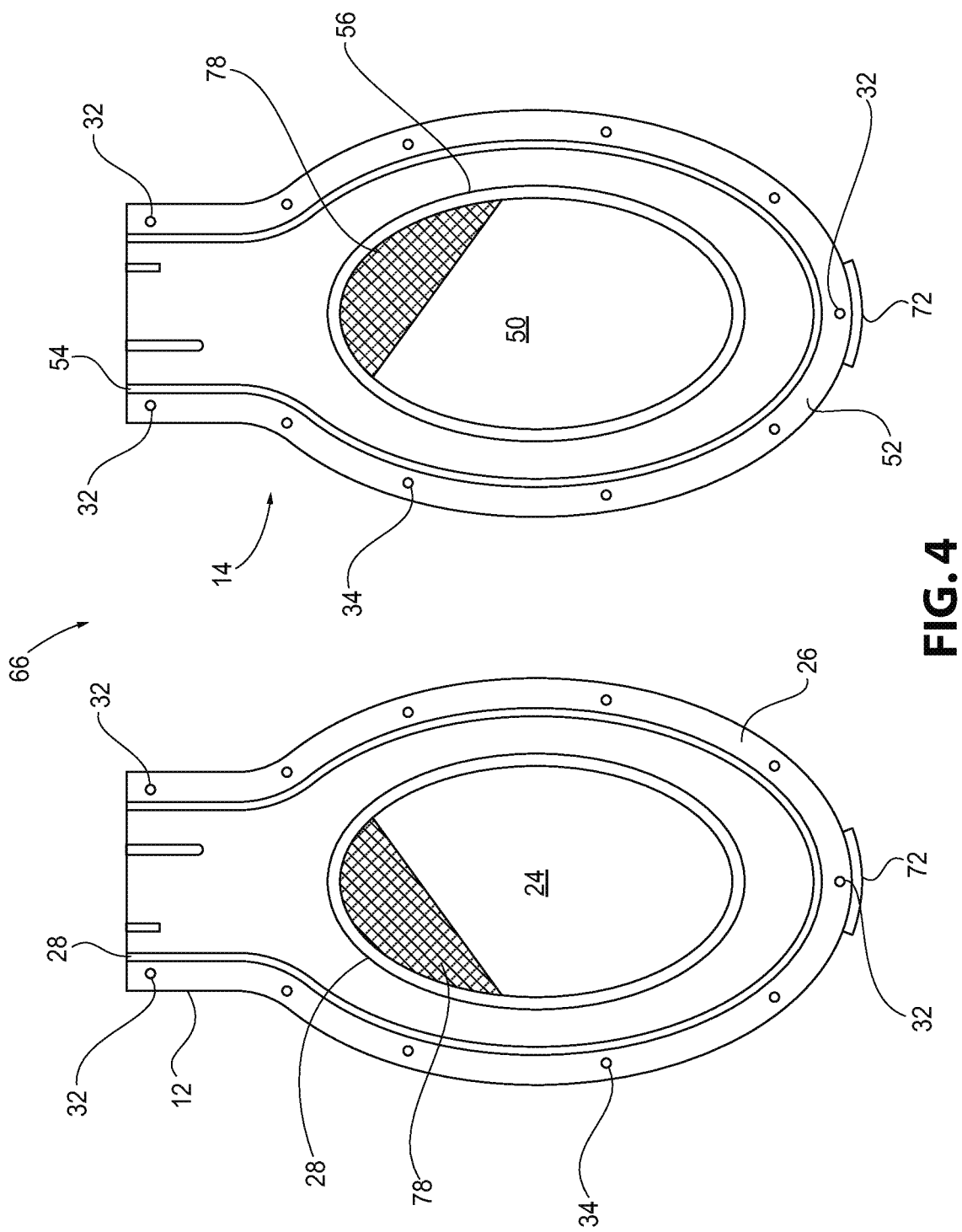
FIG. 4 is a front view of the interior surfaces of mold halves of the invention having contoured outer peripheral edges.
Figure 5A:
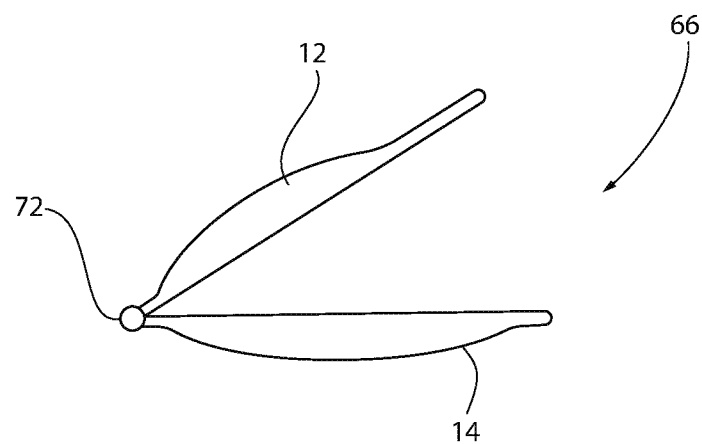
FIG. 5A is a side view of the mold halves of FIG. 4 in an open position.
Figure 5B:
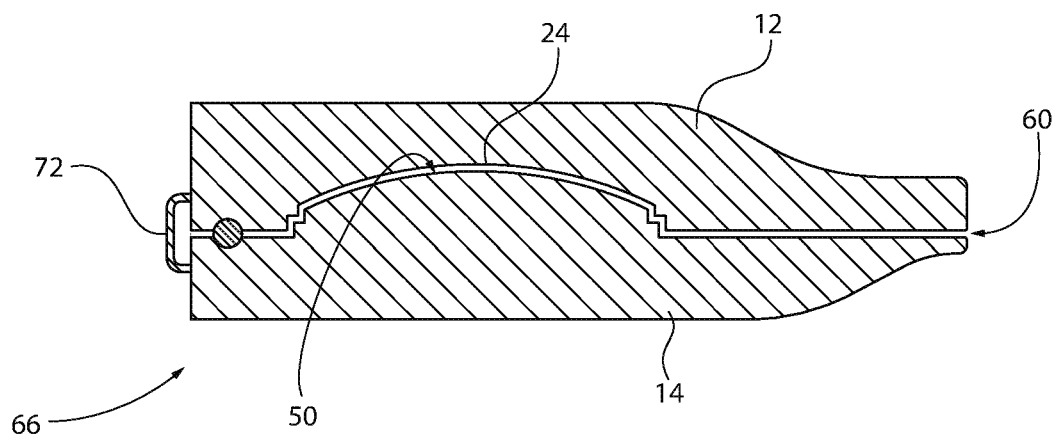
FIG. 5B is a side, sectional view of the mold halves of FIG. 5A in a closed position.

FIGS. 4, 5A and 5B illustrate a mold 66 in which the first mold half 12 and the second mold half 14 have elongated outer peripheral contours rather than the rectangular outer contours illustrated in the mold 10 shown in FIGS. 1 to 3. The first mold half 12 can be pivotally connected to the second mold half 14 by a hinge assembly 72. The first mold half 12 and second mold half 14 can be pivoted between an open position (FIG. 5A) and a closed position (FIG. 5B). Alternatively, the first mold half 12 and second hold half 14 may not be pivotally connected but can be aligned using alignment bores 32.

The first mold half 12 and/or the second mold half 14 can be made of metal. For example, the first mold half 12 and/or the second mold half 14 can be machined or cut from solid steel blocks.

Alternatively, the first mold half 12 and/or the second mold half 14 can be formed by rolled, hydroformed, or stamped metal parts. For example, the first mold half 12 and/or the second mold half 14 can be formed by metal sheets rolled, hydroformed, or stamped to form a mold half of a desired configuration. A mold formed by rolled, hydroformed, or stamped metal sheets is lighter and less expensive to manufacture than a mold formed by machined solid metal blocks. Also, rolled, hydroformed, or stamped metal sheets can be thinner than conventional solid metal mold halves, which promotes increased thermal transfer for faster heating and cooling times.

Examples of suitable metal sheets include mirrored stainless steel, electroless nickel plated stainless steel, aluminum, H13 tool steel, 304 stainless steel, and beryllium alloys, such as beryllium alloyed with copper, nickel, and/or aluminum.

The first and/or second mold halves 12, 14 can be formed economically by methods such as rolling, hydroforming, or stamping. To form the first and second mold halves 12, 14 by a rolling operation, flat, pre-polished steel sheets can be shaped in a conventional pinch roller into simple shapes. The shapes can be, for example, cylindrical or conical shapes. The steel pieces can be, for example, pre-polished steel having a thickness in the range of $23/1000$ to $123/1000$ (0.58 mm to 3.1 mm), such as $60/1000$ to $120/1000$ (1.5 mm to 3.0 mm), such as $75/1000$ to $100/1000$ (1.9 mm to 2.5 mm). The steel sheets can be cut in any conventional manner to a desired shape to form the mold halves 12, 14. For example, the steel sheets can be cut by a laser.

The first and second mold halves 12, 14 could also be formed using a hydroforming operation. Hydroforming allows the formation of mold halves 12, 14 having more complex shapes, such as complex curves or saddle shapes. In hydroforming, a flexible bladder pushes the steel sheet against a tool to conform the shape the steel sheet to the shape of the tool. The flexible bladder can be, for example, a urethane bladder. The flexible bladder can apply a pressure of greater than 10,000 pounds per square inch, such as 11,600 pounds per square inch. A protective film can be applied onto the surface of the steel sheet to be contacted by the flexible bladder to protect the surface of the steel sheet from being marked or damaged. After a first hydroforming operation, the steel sheet can be subjected to heating and a nitrogen atmosphere to fix or deaden the steel. This helps in hardening the formed steel. After this hardening step, the steel piece can be hydroformed again to set the steel sheet to the desired shape for the mold half being made.

Alternatively, the mold halves 12, 14 can be formed in a stamping operation. In a stamping operation, the steel sheet is placed between two tools. Either one or both of the tools is moved toward the steel sheet to bend and shape the steel sheet to the forms of the tools. For example, the steel sheet can be placed on an annular holder having outer edges and an open interior. The holder can be located between an upper tool and a lower tool. The upper tool can be lowered such that an outer peripheral edge of the upper tool contacts the steel sheet above the outer edge of the holder to hold the steel sheet in place. The lower tool can be extended upwardly through the open interior of the holder to press the steel sheet against the upper tool and conform the steel sheet to the desired shape or curvature. With the steel sheet held at the edges between the holder and the upper tool, the steel sheet is stretched when the lower tool is extended.

Alternatively, the first mold half 12 and/or the second mold half 14 can be made from non-metal materials, such as glass, ceramic, carbon fiber, silicone, nylon, and/or high temperature plastics.

The first mold surface 24 and/or the second mold surface 50 can be or can include a smooth surface. For example, the first mold surface 24 and/or second mold surface 50 can have a surface roughness (arithmetic surface roughness Ra) of not greater than 10 nm, such as not greater than 8 nm. A smooth surface promotes the transparency of the aircraft window panel. Surface roughness can be measured using a surface profilometer (e.g., Dektak 150 surface profilometer) or optical profilometer (Wyko NT optical profilometer).

Optionally, the first mold surface 24 and/or second mold surface 50 can be or can include a patterned region 78 (see FIG. 4). For example, the patterned region 78 can be a brushed region or roughened region formed on the mold surface. The patterned region 78 results in the portion of the aircraft window panel formed adjacent the patterned region 78 being less transparent, e.g., being translucent or obscured. By "translucent" is meant objects on the side opposite the viewer are not clearly visible. This translucent or obscured region of the aircraft window panel could be configured to hide or obscure underlying features, such as a window gasket or window heating elements.

The first mold surface 24 and/or second mold surface 50 can be a rigid surface having sufficient strength to resist bending or flexing during the casting process.

Optionally, the first mold surface 24 and/or second mold surface 50 can be a deformable surface. For example, the mold surfaces 24, 50 can be movable or deformable between a first shape and a second shape during the casting process. For example, the first mold surface 24 and/or second mold surface 50 can have a first shape before injection of a polymer precursor liquid. The first mold surface 24 and/or second mold surface 50 can deform into the second shape, for example due to the hydrostatic pressure formed in the mold chamber 62 by injection of the polymer precursor liquid into the mold 10, 66. The second shape conforms to the desired final surface contour of the aircraft window panel. The first mold surface 24 and the second mold surface 50 work in concert to provide the desired final shape.

The first mold surface 24 and/or second mold surface 50 may include a coating layer 80 formed over the mold surface (FIG. 1 illustrates a coating layer 80 over the second mold surface 50). Examples of suitable coating layers 80 include an electroless nickel deposited coating layer or a chrome layer.

Figure 6:
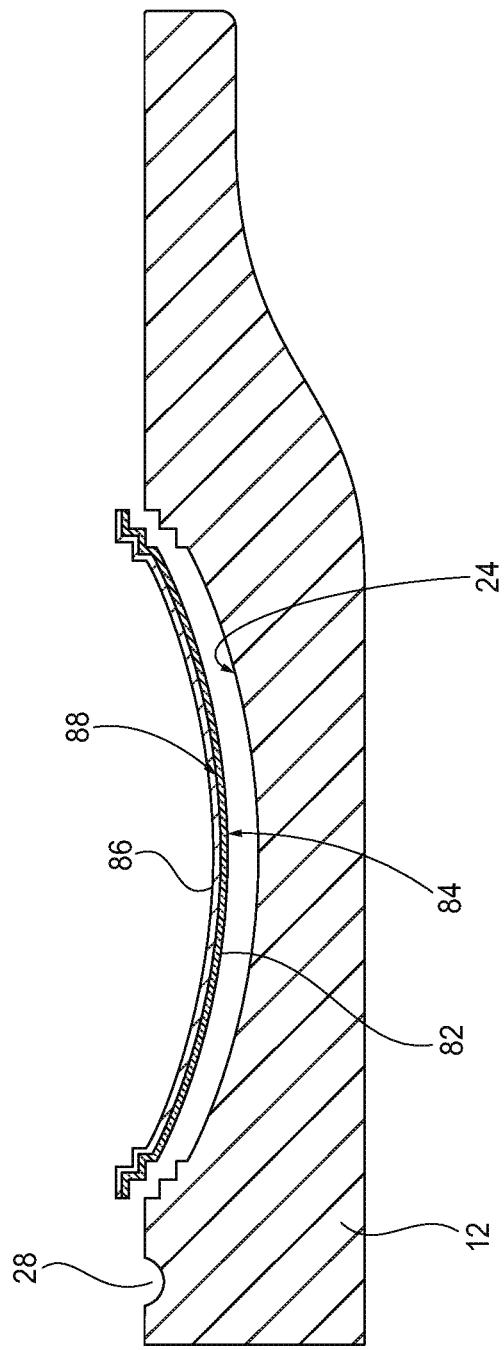
FIG. 6 is a side, sectional view of a mold half of FIG. 4 having a removable glass liner.

As shown in FIG. 6, a glass liner 82 can be located over the first mold surface 24 and/or the second mold surface 50 (only the first mold surface 24 is shown in FIG. 6). The glass liner 82 can be bent or shaped such that a back surface 84 of the glass liner 82 has a shape complementary to the mold surface (illustrated first mold surface 24). The glass liner 82 can be removable for replacement if damaged. The glass liner 82 can be tempered glass, for example thermally tempered or chemically tempered glass. The glass liner 82 can have a thickness in the range of 0.5 mm to 2 mm, such as 0.7 mm.

A coating 86 can be located over a front surface 88 of the glass liner 82. For example, the coating 86 can be designed to facilitate removal of the aircraft window panel after curing. For example, the coating 86 can be a sputter deposited (e.g., MSVD deposited) coating 86. Examples of suitable coatings 86 include steel and nickel.

Figure 7:
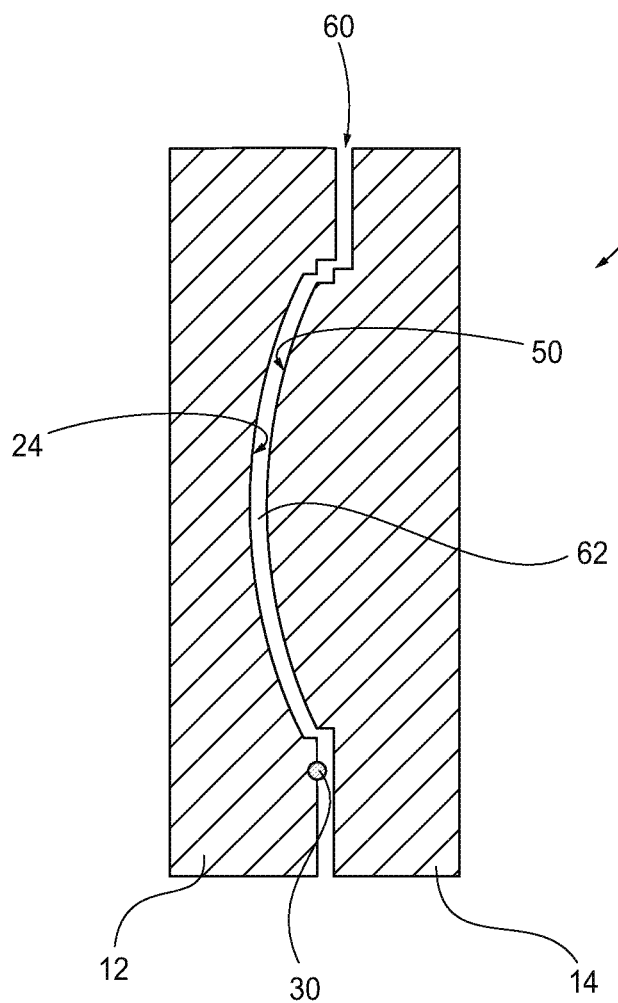
FIG. 7 is a side, sectional view of a mold configuration of the invention.

Another exemplary mold 10 configuration is shown in FIG. 7. The first mold surface 24 and the second mold surface 50 are configured such that the bottom regions of the first mold surface 24 and second mold surface 50 (i.e. the regions opposite the inlet 60) are closer together than the top regions of the first mold surface 24 and second mold surface 50 at the beginning of the casting process. That is, at the beginning of the casting process, the bottom region of the mold chamber 62 is narrower than a desired final thickness of the aircraft window panel. This intentional narrowing of the bottom of the mold chamber 62 is designed to help compensate for the outwardly directed hydrostatic pressure caused by the column of polymer precursor liquid in the mold chamber 62 during the casting process. This hydrostatic pressure tends to push the bottoms of the mold halves 24, 50 away from each other, resulting in a widening of the distance between the bottoms of the mold halves 12, 14. During the casting process, the bottoms of the mold halves 12, 14 are pushed outwardly away from the initial narrow position to a position at which they correspond to the desired final shape of the aircraft window panel.

Methods of casting an aircraft window will now be described.

A release agent may be applied to the first mold surface 24 and/or the second mold surface 50 prior to casting. Suitable release agents include Gruber Systems MR HiTec release agent, Mavcoat release agent, and Frekote Cur release agent. The release agent can be applied before each casting process or only after a selected number of castings have been made. For example, such as after every five castings, or every ten castings, or every twenty castings, or every thirty castings. Alternatively, no release agent may be applied.

Objects to be incorporated into the window panel can be placed in the mold chamber 62 prior to injection of the polymer precursor liquid. Such objects include, for example, a gasket, a peripheral web, or a wire grid.

The first mold half 12 is connected to the second mold half 14. For the exemplary molds 10 shown in FIGS. 1 to 3 and 7, the first mold half 12 and second mold half 14 are positioned such that the fastener holes 34 align. Fasteners 36, such as threaded bolts, are inserted through the fastener holes 34 and tightened. As the bolts are tightened, the inner flanges 26, 52 of the first mold half 12 and second mold half 14 press against and compress the gasket 30. The gasket 30 can be of sufficient diameter such that the inner surfaces of the flanges 26, 52 do not contact each other when the bolts are tightened. The first mold half 12 and/or second mold half 14 can be thicker at the bottom portion (with respect to a direction of filling) to compensate for increased hydrostatic pressure at the bottom portion of the mold.

For the exemplary mold 66 shown in FIGS. 4, 5A, and 5B, the first mold half 12 and second mold half 14 can be connected together. For example, the mold halves 12, 14 can be pivoted to the closed position around the optional hinge assembly 72. The fasteners 36 can then be inserted through the fastener holes 34 and tightened.

Figure 8A:
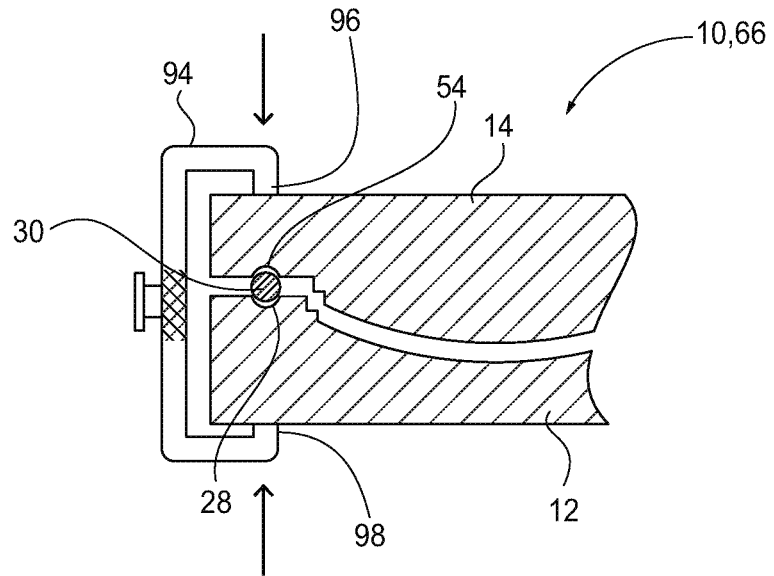
FIG. 8A is a side, sectional view of a peripheral region of a mold of the invention illustrating a method of clamping the mold halves together.

Alternatively, as shown in FIG. 8A, first mold half 12 and/or second mold half 14 may be free of fastener holes 34. Rather than using fasteners 36 extending through fastener holes 34, the mold halves 12, 14 can be secured together using clamps 94. The clamps 94 can be, for example, screw-type clamps or spring-biased clamps. For example, clamps 94 can be placed at spaced locations around the perimeter of the mold 66. The clamps 94 are positioned such that the opposed clamp arms 96, 98 are located in line with the gasket tracks 28, 54 and, thus, in line with the gasket 30. As the clamp 94 is tightened, the clamping force (see arrows in FIG. 8) generated by the clamp arms 96, 98 pressing against the first mold half 12 and the second mold half 14 is applied directly in line with the gasket 30. The gasket 30 is compressed, which allows for movement of the mold halves 12, 14 during the casting process (e.g., initial expansion caused by the hydrostatic pressure of the polymeric liquid precursor liquid in the mold chamber and then contraction as the polymer precursor liquid cures to form the aircraft window panel). This helps to maintain the mold halves 12, 14 securely connected throughout the casting process.

Figure 8B:
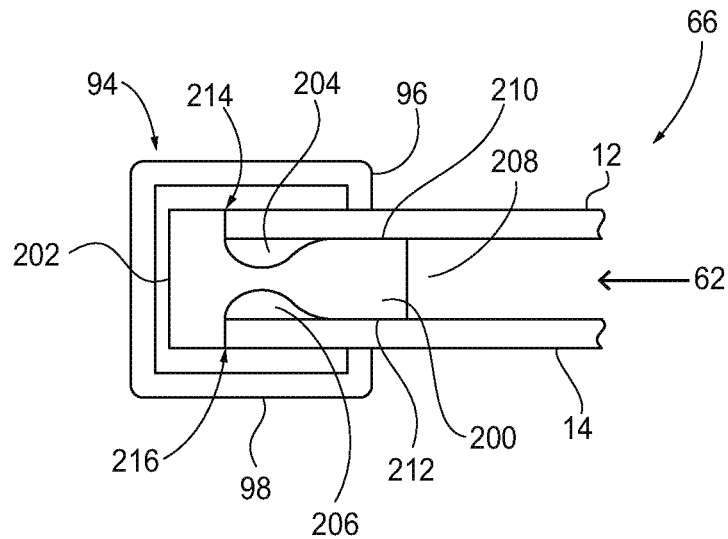
FIG. 8B is a side, sectional view of a peripheral region of a mold of the invention illustrating another method of clamping the mold halves together using a shaped gasket.
Figure 8C:
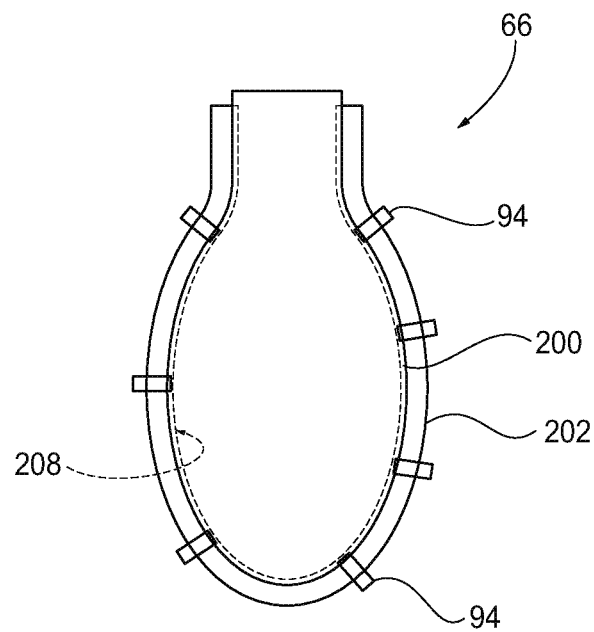
FIG. 8C is a plan view of the mold of FIG. 8B.
Figure 8D:
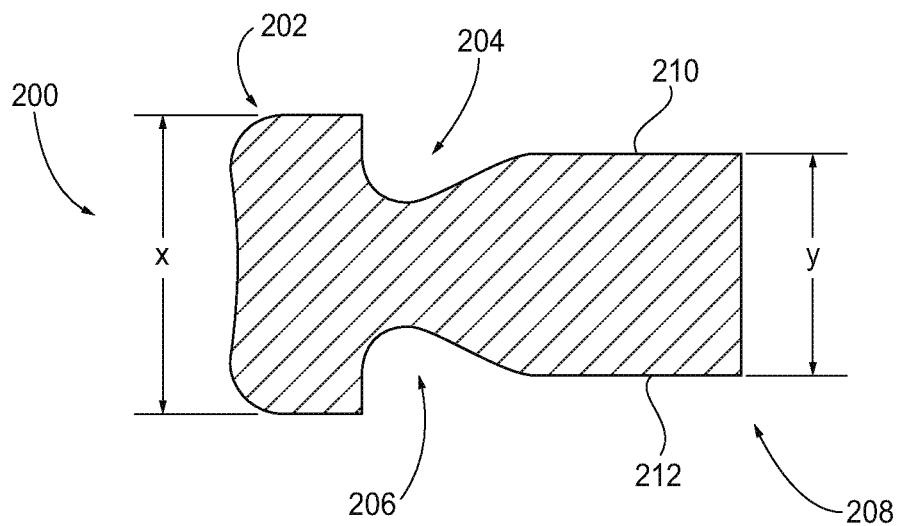
FIG. 8D is a side, sectional view of a shaped gasket of the invention.

FIGS. 8B and 8C show an alternative example of connecting a first mold half 12 with a second mold half 14 to form the mold 66. In FIG. 8B, the first mold half 12 and the second mold half 14 are free of gasket tracks. That is, the outer peripheral region of the interior surface of the mold halves 12, 14 is smooth or substantially smooth. A shaped gasket 200 is positioned between the first mold half 12 and the second mold half 14, and runs around the outer periphery of the mold 66. As shown in FIGS. 8B and 8D, the shaped gasket 200 includes an outer end 202, with an upper groove 204 and a lower groove 206 located adjacent the outer end 202. The shaped gasket 200 includes an inner end 208, with an upper flat surface 210, and a lower flat surface 212. The width "x" of the outer end 202 is greater than the width "y" of the inner end 208. The peripheral edge 214 of the first mold half 12 engages the upper groove 204 and the peripheral edge 216 of the second mold half 14 engages the lower groove 206. By "engage" is meant that the peripheral edges 214, 216 extend into the grooves 204, 206 and can contact a surface of the grooves 204, 206. For example, the outer peripheral edges 214, 216 of the mold halves 12, 14 can contact or abut the inwardly facing surfaces of the grooves 204, 206. The inner end 208 of the shaped gasket 200 extends into the mold chamber 62 and will be in contact with the polymeric material injected into the mold chamber 62. Similarly to FIG. 8A, the mold halves 12, 14 can be kept in place by one or more clamps 94 positioned around the periphery of the mold 66. The clamp arms 96, 98 of the clamps 94 press downwardly on the mold halves 12, 14 in the region above the flat surfaces 210, 212. This promotes a more even distribution of pressure. The shaped gasket 200 can be, for example, black silicone rubber. The shaped gasket 200 can have a durometer in the range of 50 to 90, such as 60 to 70.

Figure 8E:
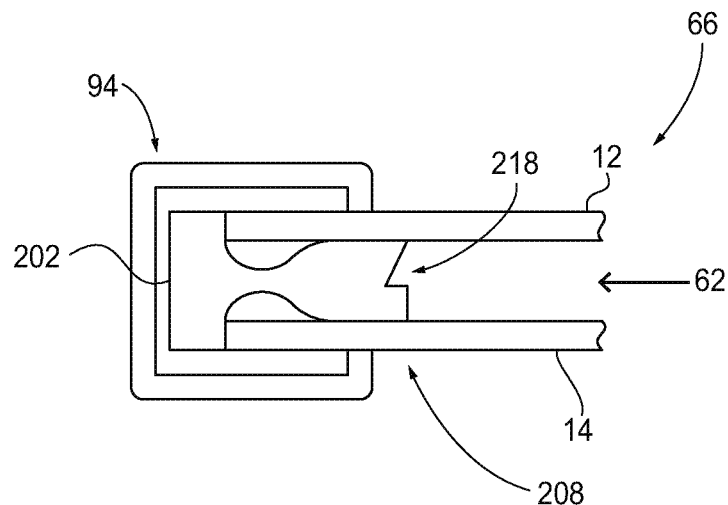
FIG. 8E is a side, sectional view of a peripheral region of a mold similar to FIG. 8B having a modified shaped gasket.

FIG. 8E is similar to FIG. 8B but the inner end 208 of the shaped gasket 200 includes a rabbited surface 218 conforming to a mirror image of a desired rabbited perimeter of the transparency being molded. The shaped gasket 200 can be covered with a release agent before placed into position such that, when the transparency is removed from the mold 66, the first and second mold halves 12, 14 and the shaped gasket 200 are removed, leaving the perimeter of the transparency with the rabbited edge configuration defined by the rabbited surface 218 of the inner end 208 of the shaped gasket 200.

Figure 8F:
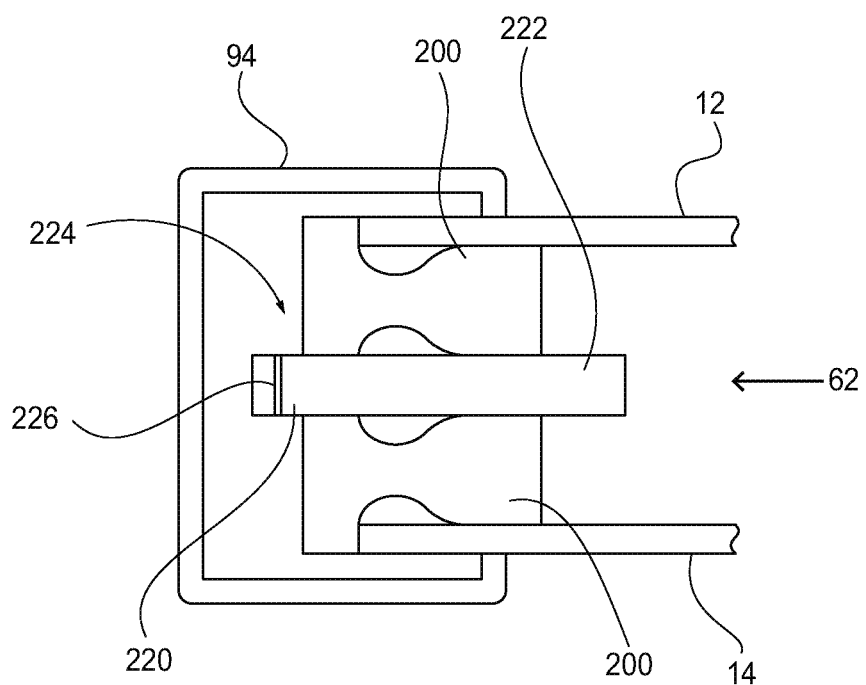
FIG. 8F is a side, sectional view of a peripheral region of a mold illustrating a method of clamping the mold halves together to incorporate a peripheral web.
Figure 9:
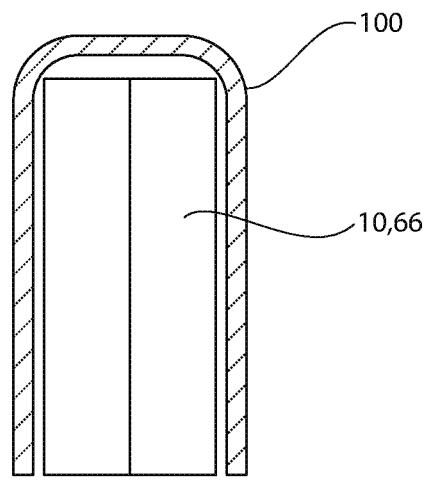
FIG. 9 is a side, sectional view of a mold of the invention having a heating jacket.

FIG. 8F shows the use of two shaped gaskets 200 located between the first and second mold halves 12, 14. In this configuration, an article 220 can be extended into the interior of the mold chamber 62 and held in place by the pressure applied by the clamps 94 pressing downwardly on the shaped gaskets 200. The article 220 can be, for example, a flexible or rigid web, such as a gasket or meshwork, having a first end 222 that extends into the mold chamber 62 and will become embedded in the transparency and a second end 224 that extends out of the mold 66 and will extend outwardly around the perimeter of the transparency. The article 220 can include one or more fastening elements 226, such as holes or hooks, to help secure the transparency to an aircraft framework.

The mold 10, 66 may be preheated prior to injecting the polymer precursor liquid. For example, the mold 10, 66 may be placed in an oven. The mold 10, 66 may be preheated to a temperature in the range of 200° F. to 300° F., such as 250° F. to 275° F. The polymer precursor liquid can be injected into the mold chamber 62 in to oven or outside of the oven.

Optionally, for the exemplary mold 10 shown in FIGS. 1 to 3, the optional heating elements 40 can be activated to heat the mold halves 12, 14 to a desired preheat temperature rather than using an oven.

Optionally still, as shown in 9, the molds 10, 66 can be heated and/or preheated using a heating jacket 100. For example, the heating jacket 100 can be an electrical heating jacket. The heating jacket 100 can have an interior configured to conform or surround at least a portion of the exterior of the mold 10, 66.

The polymer precursor liquid is injected into the mold chamber 62 via the mold inlet 60 (see FIG. 3). In the broad practice of the invention, the polymer precursor liquid can be any polymer precursor liquid capable of curing to form a polymeric aircraft window panel. Examples of polymer precursor materials include precursors for acrylic polymers, such as polyacrylates; polyalkylmethacrylates, such as polymethylmethacrylates, polyethylmethacrylates, and polypropylmethacrylates; polyurethane precursors; polycarbonate precursors; polyalkylterephthalates, such as polyethyleneterephthalate (PET), polypropyleneterephthalates, polybutyleneterephthalates; polysiloxane-containing polymers; or copolymers of any monomers for preparing these, or mixtures thereof. For example, precursors for acrylic, polycarbonate, polyurethane, and/or polyureaurethane polymers. In a preferred practice, the polymer precursor liquid is a polyurethane precursor liquid, such as a polyureaurethane precursor liquid. An example of a polyurethane precursor liquid is the material made by PPG Industries, Inc., under the trade name OPTICOR, which is a castable polyurethane material (described in US Publication No. 2013/0095311 A1).

After injection of the polymer precursor liquid, the mold 10, 66 is heated to a temperature and for a time sufficient to cure the polymer precursor liquid. After curing, the mold 10, 66 is cooled. For example, the mold 10, 66 can be allowed to cool under ambient conditions until the mold 10, 66 reaches a temperature which allows safe handling of the mold 10, 66.

The fasteners 36 and/or clamps 94 are removed. The first mold half 12 and second mold half 14 are separated. The aircraft window panel is removed from the mold 10, 66. For example, the window panel can be removed using compressed air or plastic spatulas to help prevent scratching the surfaces of the aircraft window panel. If necessary, any excess peripheral material or flashing can be removed from the aircraft window panel.

The resultant aircraft window panel has opposed major surfaces (e.g., a first surface and a second surface) with a final shape corresponding to the shapes and contours defined by the first mold surface 24 and second mold surface 50. No extra machining, cutting, or shaping steps are required to further contour or shape the opposed major surfaces of the aircraft window panel before inserting the window panel in the frame. The edge configuration or the majority of the edge configuration of the window panel is formed by casting, not machining of the edge regions of the panel.

During the casting process, the polymer precursor liquid can be injected into the mold 10, 66 while the mold 10, 66 is vertical or substantially vertical. After injection, the mold 10, 66 can be placed on its front 22 or back 16 to reduce the hydrostatic force created by the polymer precursor liquid in the mold chamber 62.

Figure 10:
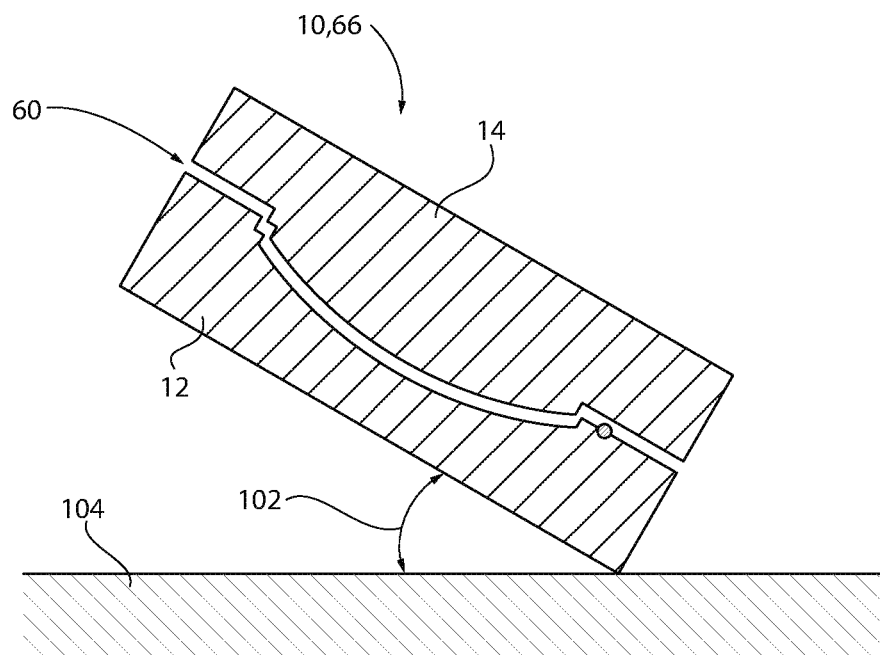
FIG. 10 is a side, sectional view of a mold of the invention at an inclined angle.

Alternatively, as shown in FIG. 10, the polymer precursor liquid can be injected into the mold 10, 66 while the mold 10, 66 is inclined, for example, at an inclination angle 102 with respect to a surface 104 on which the mold 10, 66 is located. For example, polymer precursor liquid can be injected into the mold 10, 66 at an inclination angle 102 in the range of 5° to 70°, such as 10° to 50°, such as 15° to 45°, such as 20° to 40°. For example, the inclination angle 102 can be in the range of 20° to 30°. By inclining the mold 10, 66 for injection of the polymer precursor liquid, the hydrostatic pressure developed at the bottom of the mold chamber 62 is reduced. This reduces the outwardly directed force caused by the hydrostatic pressure pushing the first mold half 12 and second mold half 14 apart.

Figure 11:
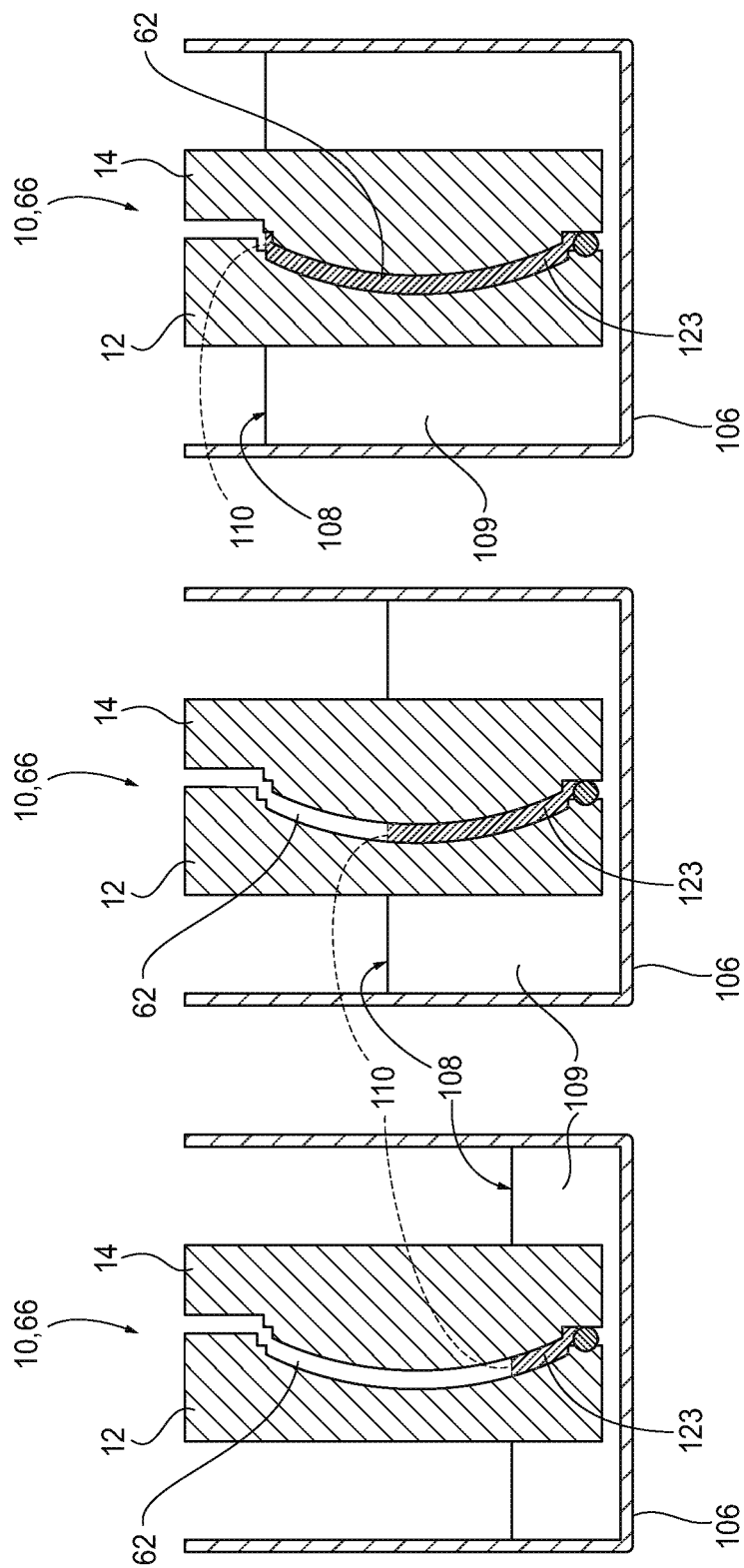
FIG. 11 illustrates a mold injecting process of the invention incorporating a liquid bath.

Optionally, as shown in FIG. 11, the mold 10, 66 can be placed in a liquid bath 106. As the polymer precursor liquid 123 is injected into the mold chamber 62, the level 108 of liquid 109 in the bath 106 can be controlled such that the level 108 of liquid 109 in the bath 106 corresponds or substantially corresponds to the level 110 of the polymer precursor liquid 123 in the mold chamber 62. The inwardly directed hydrostatic pressure of the liquid 109 in the bath 106 pressing against the mold halves 12, 14 counteracts the outwardly directed hydrostatic pressure caused by the column of polymer precursor liquid 123 in the mold chamber 62. This helps prevent the first and second mold halves 12, 14 being pushed apart. Exemplary liquids 109 for use in the liquid bath 106 include the Benzoflex family of plasticizers, commercially available from SpecialChem SA of Paris, France. In this example of the invention, the bottom portions of the mold halves need not be closer together to compensate for hydrostatic forces since to the pressure of the liquid 109 in the bath 106 can provide such compensation. Additionally or alternatively, the bottom portions of the mold halves need not be thicker as described above. Additionally, the liquid 109 can be heated to heat the mold 10, 66 and the liquid inside the mold 10, 66.

Figure 12:
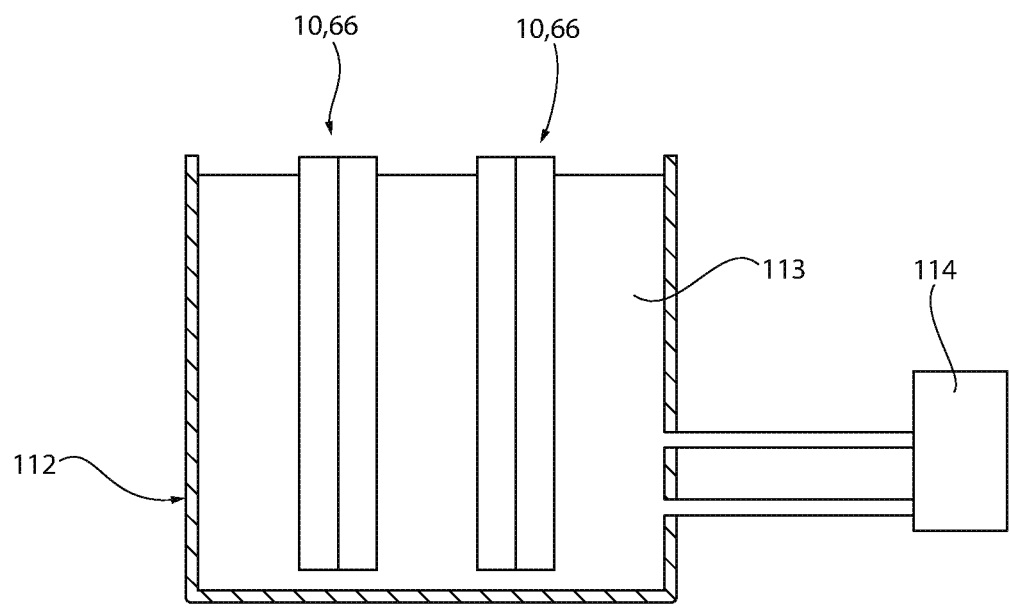
FIG. 12 illustrates a mold heating process using a fluid bath having a recirculating heater.

As shown in FIG. 12, the temperature of the mold 10, 66 can be selectively controlled during the curing process by locating the mold 10, 66 in a temperature controlled fluid bath 112. The fluid 113 in the fluid bath 112 can be in flow communication with a recirculating heater 114. The fluid bath 112 can be the same as the liquid bath 106 described above with respect to FIG. 11. Alternatively, the fluid bath 112 can be a different bath than the liquid bath 106. For example, the fluid bath 112 can be a separate bath in which the mold 10, 66 is placed either before, during, or after filling with the polymer precursor liquid.

Figure 13:
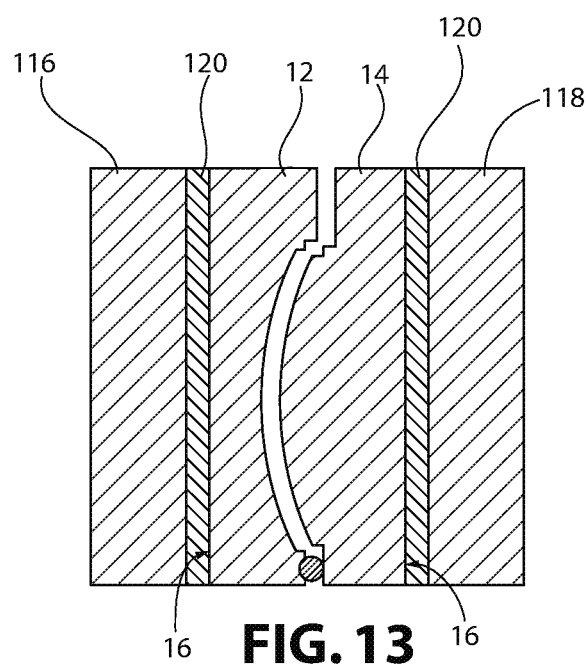
FIG. 13 is a side, sectional view of a mold curing assembly of the invention.

As shown in FIG. 13, the first mold half 12 and the second mold half 14 can be located between two rigid supports 116, 118 for injection of the polymer precursor liquid and/or during the curing process. An elastomeric material 120 is located between the backs 16 of the mold halves 12, 14 and the supports 116, 118. As the mold 10, 66 is filled with the polymer precursor liquid, the hydrostatic pressure caused by the column of polymer precursor liquid pushes outwardly against the mold halves 12, 14. The mold halves 12, 14 press outwardly against the elastomeric material 120 confined between the mold backs 16 and the supports 116, 118. The elastomeric material 120 acts as a buffer or shock absorber to provide an inwardly directed compressive force to counteract or dampen the outwardly directed hydrostatic pressure force. This helps to maintain the mold halves 12, 14 at the desired spaced distance.

FIG. 14 illustrates a casting method of the invention using mold halves 12, 14 with deformable mold surfaces 24, 50. Prior to filling with the polymer precursor liquid 123, the mold surfaces 24, 50 are in a first position 122 (FIG. 14A) defining a first shape or contour. This first shape does not conform to the desired final shape of the aircraft window panel. As polymer precursor liquid 123 is added to the mold 10, 66, the hydrostatic pressure caused by the column of polymer precursor liquid 123 causes the mold surfaces 24, 50 to deflect or deform to a second position 124 (FIG. 14B) defining a second shape or contour. The second shapes of the mold surfaces 24, 50 in the second position 124 correspond to the desired final shape of the aircraft window panel surfaces.

Finite element analysis (FEA) can be used to calculate the shapes of the mold surfaces 24, 50 needed so that the mold surfaces 24, 50 deflect from the first position 122 to the second position 124. FEA is an iterative process in which the mold surface deflection is calculated, the mold surfaces 24, 50 are modified, the deflection of the modified mold surfaces is determined, the mold surfaces are modified again, etc., until the calculated and desired shapes of the mold surfaces 24, 50 are within an acceptable value.

Figure 15:
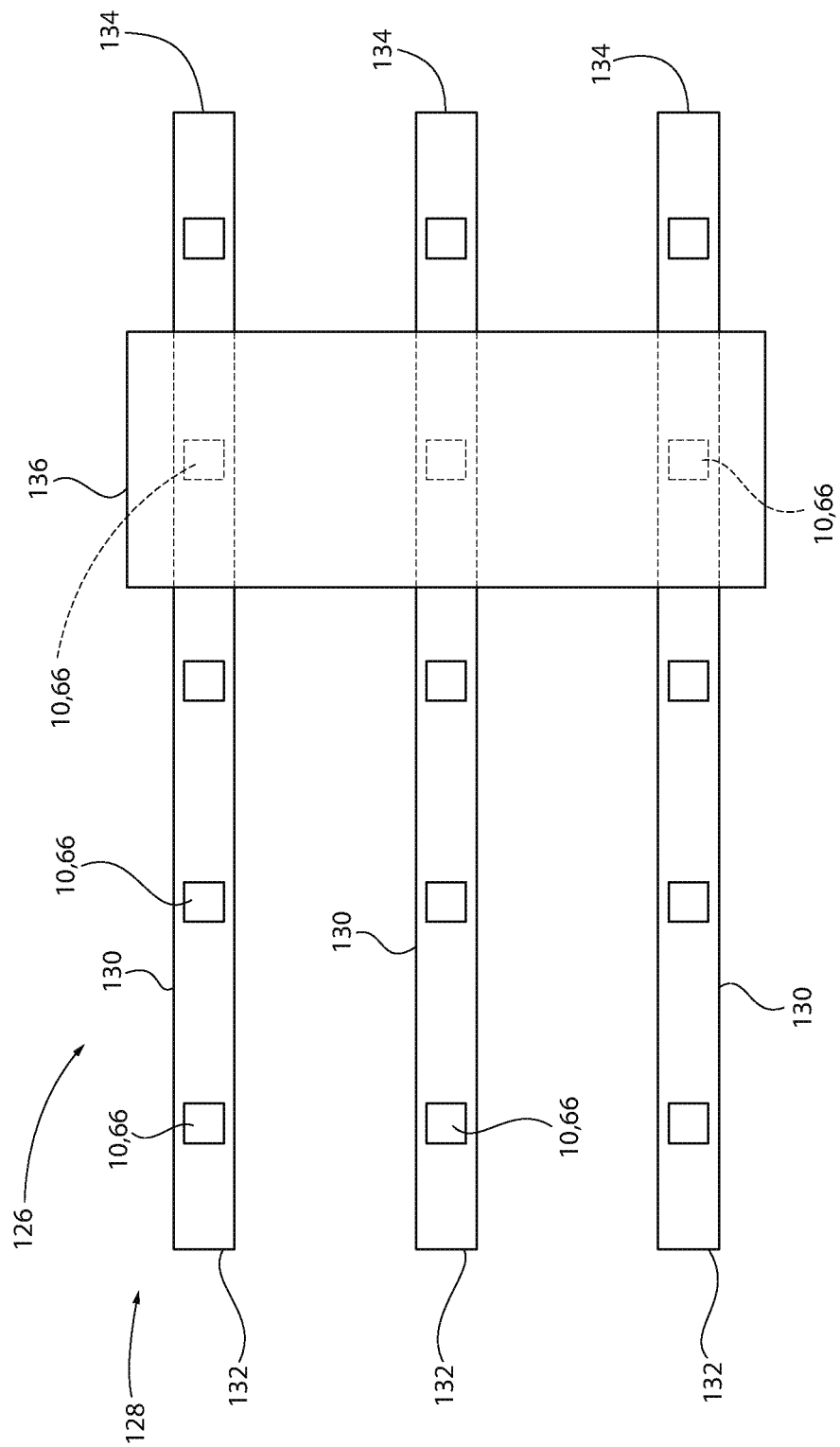
FIG. 15 is a plan view of a continuous casting assembly of the invention.
Figure 16:
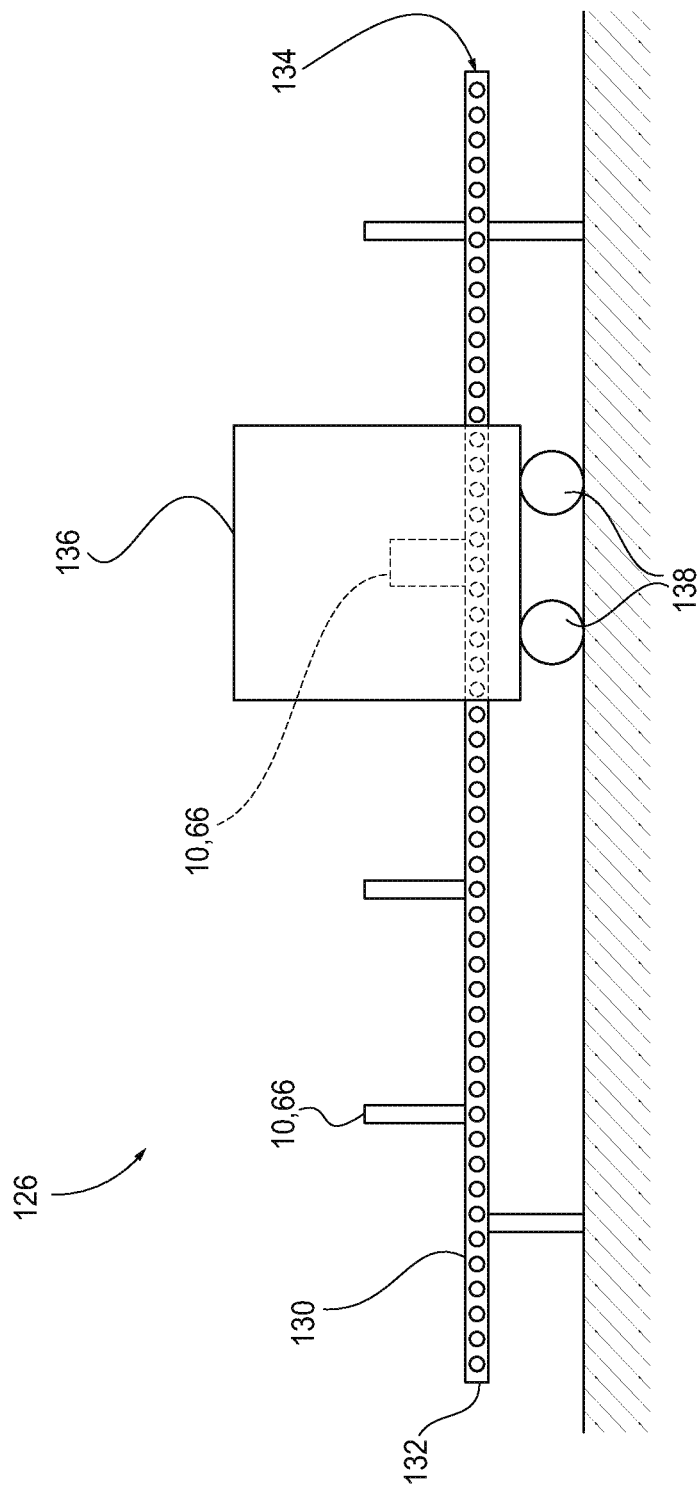
FIG. 16 is a side view of the continuous casting assembly of FIG. 15.

An exemplary aircraft window panel continuous casting assembly 126 is schematically shown in FIGS. 15 and 16. The continuous casting assembly 126 includes a conveyor system 128 having at least one conveyor track 130. The casting assembly 126 preferably comprises a plurality of conveyor tracks 130 having a first end 132 (entry end) and a second end 134 (exit end). The conveyor tracks 130 can be, for example, conventional roller conveyors. The conveyor tracks 130 extend through a heating chamber 136. The heating chamber 136 can be a conventional oven.

The heating chamber 136 can be a stationary heating chamber 136. Alternatively, the heating chamber 136 can be a movable, e.g., reciprocating, heating chamber 136. For example, the heating chamber 136 can be supported on a movement device 138, such as wheels, rollers, or rails. Or, the heating chamber 136 can be suspended from a movable overhead support.

When the heating chamber 136 is a stationary heating chamber 136, the molds 10, 66 are injected with a polymer precursor liquid in any manner described above. For example, the injection can take place in an oven located near the first ends 132 of the conveyor tracks 130. The molds 10, 66 can then be transported to and positioned onto the conveyor tracks 130 at or near the first ends 132. Optionally, the molds 10, 66 can first be placed onto the conveyor tracks 130 and then injected with the polymer precursor liquid.

The conveyor tracks 130 convey the molds 10, 66 through the heating chamber 136. The speed of the conveyor tracks 130 can be set to provide a desired residence time for the molds 10, 66 in the heating chamber 136 sufficient for the polymer precursor liquid to cure.

As the molds 10, 66 leave the heating chamber 136, they begin to cool down. This cooling can be ambient air cooling and/or forced cooling, such as by fans or blowers. The length of the conveyor tracks 130 can be configured to provide a sufficient time for the molds 10, 66 to reach a desired temperature before they arrive at the second end 134 of the conveyor tracks 130. Alternatively, the molds 10, 66 can be removed from the conveyor tracks 130 after they leave the heating chamber 136 and can be transported to another location for cooling.

When the heating chamber 136 is a movable heating chamber 136, the molds 10, 66 can be filled and placed onto the conveyor tracks 130 as described above. The heating chamber 136 can then be conveyed (or reciprocally moved) along the conveyor tracks 130 (while the conveyor tracks 130 are not moving). The speed of movement of the heating chamber 136 can be controlled such that the stationary molds 10, 66 are within the heating chamber 136 for a sufficient time for the polymer precursor liquid to cure. After the heating chamber 136 moves past a mold 10, 66, the mold 10, 66 can be left on the conveyor track 130 for a sufficient time to cool to a desired temperature. Alternatively, the mold 10, 66 can be removed from the conveyor track 130 and transported to another location for cooling.

Additionally or alternatively to the heating chamber 136, the molds 10, 66 can be individually heated molds as described above.

As will be appreciated from the above discussion, the present invention provides methods and apparatuses to allow an aircraft window panel to be cast-to-shape so that little or no post-forming processing is required. By "cast-to-shape" is meant that the material for making the window panel is injected into a mold 10, 66 such that upon curing, the cast window panel has the desired features (e.g., shape/contour of the window panel major surfaces and/or desired peripheral edge structure and/or other features, such as pressure equalization holes) such that little or no additional manufacturing steps (such as milling, grinding, cutting, or drilling) are required for incorporation of the window panel into an aircraft window. The cast window panel is essentially in its final desired form when it comes out of the mold 10, 66 and ready for incorporation into the aircraft window.

In the above examples, the polymer precursor liquid was injected into a mold chamber 62 between two shaped mold surfaces 24, 50. In another aspect of the invention, the polymer precursor liquid can be injected into the space between two spaced polymer sheets. The polymer sheets can be, for example, polyurethane or polycarbonate sheets. The polymer formed by the cured polymer precursor liquid connects the polymer sheets together to form a laminated structure.

In the above methods, the mold 10, 66 was filled from the top. That is, the mold 10, 66 was positioned such that the inlet 60 was located at the top of the mold 10, 66. Fluid being added to the mold 10, 66 could flow under the influence of gravity into the mold 10, 66. Or, the fluid could be injected under pressure, such as by pressurized air, into the mold 10, 66. In another aspect of the invention, the mold 10, 66 can be positioned such that the inlet 60 is at the bottom of the mold 10, 66. The polymer precursor liquid can be injected into the mold chamber 62 using a vacuum system or pressure assist system. Alternatively, the mold 10, 66 can be positioned such that the inlet 60 is on the side of the mold 10, 66.

Figure 17:
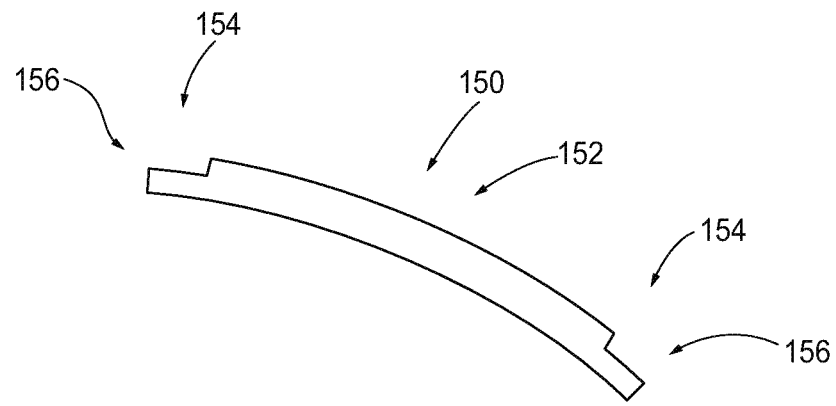
FIG. 17 illustrates an exemplary window panel formed in accordance with the invention.
Figure 18:
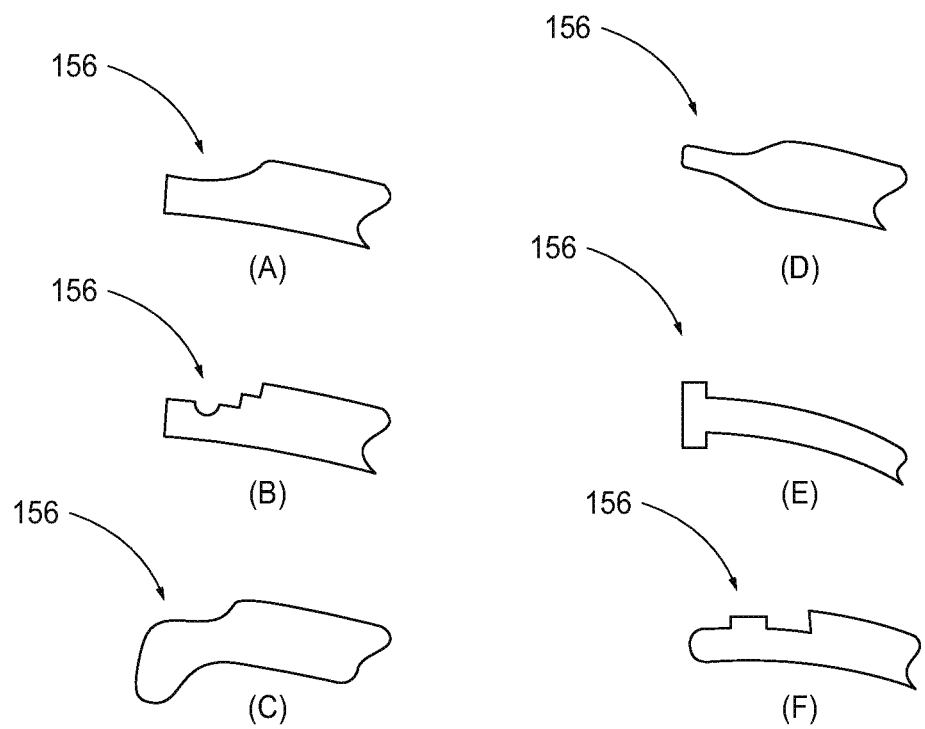
FIG. 18 illustrates various exemplary peripheral edge configurations for a window panel made in accordance with the invention.

FIG. 17 illustrates an exemplary window panel 150 made in accordance with the invention. The window panel 150 includes a central viewing area 152 and an outer peripheral edge 154 having a complex shape 156. By "complex shape" 156 is meant a shape with edges and/or contours and/or curves. Such complex shapes are typically present to engage a framework to hold the window panel 150 in place during operation of the aircraft. Examples of complex shapes 156 that can be formed in accordance with the invention are shown in FIG. 18. The complex shapes 156 shown in FIG. 18 are simply exemplary and are not exhaustive of the complex shapes 156 that can be formed in accordance with the invention. In the practice of the invention, such complex shapes 156 can be formed on the window panel 150 during the molding process. This reduces or eliminates having to cut or machine such complex shapes 156 into the periphery of the window panel 150, as was done in prior non-casting fabrication methods.

The invention can be described further in the following numbered clauses.

Clause 1: A mold for casting a polymeric aircraft window panel, comprising: a first mold half comprising a first mold surface; and a second mold half comprising a second mold surface, wherein the first mold surface and/or the second mold surface have a shape conforming to a final shape for opposed major surfaces of an aircraft window panel.

Clause 2: The mold of clause 1, wherein the first mold half and/or the second mold half comprise rolled, hydroformed, or stamped metal sheets.

Clause 3: The mold of clauses 1 or 2, wherein the first mold surface and/or the second mold surface comprise rolled, hyroformed, or stamped metal sheets.

Clause 4: The mold of any of clause 1 to 3, wherein the first mold half and/or the second mold half comprise a metal selected from the group consisting of mirrored stainless steel, polished stainless steel, electroless nickel plated stainless steel, aluminum, H13 tool steel, 304 stainless steel, and beryllium alloys, such as beryllium alloyed with copper, nickel, and/or aluminum.

Clause 5: The mold of any of clauses 1 to 4, wherein the first mold half and/or the second mold half comprise stainless steel or aluminum.

Clause 6: The mold of any of clauses 1 to 5, wherein the first mold half is pivotally connected to the second mold half.

Clause 7: The mold of any of clauses 1 to 6, wherein the first mold half comprises a first mold surface, the second mold half comprises a second mold surface, and the first mold surface and/or the second mold surface have a surface roughness not greater than 10 nm, preferably not greater than 8 nm.

Clause 8: The mold of any of clauses 1 to 6, wherein the first mold half comprises a first mold surface, the second mold half comprises a second mold surface, and the first mold surface and/or the second mold surface comprise a patterned region.

Clause 9: The mold of any of clauses 1 to 8, wherein the first mold half comprises a first mold surface, the second mold half comprises a second mold surface, and a coating is located over the first mold surface and/or the second mold surface, wherein the coating is selected from the group consisting of an electroless nickel deposited layer and a chrome plated layer.

Clause 10: The mold of any of clauses 1 to 9, wherein the first mold half comprises a first mold surface, the second mold half comprises a second mold surface, and a glass liner is removably located over the first mold surface and/or the second mold surface.

Clause 11: The mold of clause 10, wherein the glass liner conforms to a shape of the first mold surface and/or the second mold surface.

Clause 12: The mold of clauses 10 or 11, including a sputter deposited coating over an outer surface of the glass liner.

Clause 13: The mold of clause 12, wherein the sputter deposited coating is selected from the group consisting of steel and nickel.

Clause 14: The mold of any of clauses 10 to 13, wherein the glass liner comprises tempered glass.

Clause 15: The mold of any of clauses 10 to 14, wherein the glass liner comprises chemically tempered glass.

Clause 16: The mold of any of clauses 1 to 15, wherein the first mold half comprises a first flange comprising first fastener holes, wherein the second mold half comprises a second flange comprising second fastener holes, and wherein the first fastener holes and second fastener holes align when the first mold half is mated to the second mold half.

Clause 17: The mold of any of clauses 1 to 15, wherein the first mold half comprises a first flange, wherein the second mold half comprises a second flange, and wherein the first flange and the second flange are free of fastener holes.

Clause 18: The mold of any of clauses 1 to 17, wherein the first mold half comprises a first flange comprising a first gasket track, wherein the second mold half comprises a second flange comprising a second gasket track, and wherein the first gasket track and second gasket track align when the first mold half is mated to the second mold half.

Clause 19: The mold of clause 18, including a plurality of clamp fasteners, wherein the clamp fasteners are configured to apply a clamping force directly over the aligned gasket tracks when the first mold half is mated to the second mold half.

Clause 20: The mold of clauses 18 or 19, including a gasket positioned in the gasket tracks such that the first flange does not contact the second flange when the first mold half is mated to the second mold half.

Clause 21: The mold of any of clauses 1 to 17, wherein the first mold half comprises a first flange having a peripheral edge, wherein the second mold half comprises a second flange having a peripheral edge, and wherein the first flange and the second flange are free of gasket tracks.

Clause 22: The mold of clause 21, including a shaped gasket located between the peripheral edge of the first mold half and the peripheral edge of the second mold half.

Clause 23: The mold of clause 22, wherein the shaped gasket comprises an outer end, an inner end, a pair of opposed groves near the outer end, and a pair of opposed flat surfaces near the inner end.

Clause 24: The mold of clause 23, wherein the peripheral edge of the first mold half engages one of the grooves and the peripheral edge of the second mold half engages the other groove.

Clause 25: The mold of clauses 23 or 24, wherein the second end of the shaped gasket comprises a planar face.

Clause 26: The mold of clauses 23 or 24, wherein the second end of the shaped gasket comprises a rabbited face.

Clause 27: The mold of any of clauses 23 or 26, wherein a width of the first end of the shaped gasket is greater than a width of the second end of the shaped gasket.

Clause 28: The mold of any of clauses 23 to 27, including a plurality of clamp fasteners, wherein the clamp fasteners are configured to apply a clamping force on the first mold half and second mold half over the flat surfaces.

Clause 29: The mold of any of clauses 1 to 28, wherein the first mold half and/or the second mold half includes a deformable mold surface having a first shape before injection of a polymer precursor liquid into the mold and a second shape after injection of a polymer precursor liquid into the mold.

Clause 30: The mold of any of clauses 1 to 29, wherein the first mold half and the second mold half are configured such that a bottom region of a mold chamber narrower than a top region of the mold chamber when the first mold half is mated to the second mold half before injection of the polymer precursor liquid.

Clause 31: The mold of any of clauses 1 to 30, including a heating jacket configured to engage at least a portion of the mold.

Clause 32: The mold of any of clauses 1 to 31, wherein the first mold half and/or the second mold half includes a heating element.

Clause 33: A mold for casting a polymeric aircraft window panel, comprising: a rolled, hydroformed, or stamped metal first mold half; and a rolled, hydroformed, or stamped metal second mold half.

Clause 34: A mold for casting a polymeric aircraft window panel, comprising: a first mold half; and a second mold half, wherein the mold halves comprise a material selected from the group consisting of glass, ceramic, carbon fiber, silicone, nylon, and high temperature plastics.

Clause 35: The mold of clause 34, wherein the first mold half and/or the second mold half comprise a polyurethane polymer and/or a polycarbonate polymer.

Clause 36: A casting assembly for casting a polymeric aircraft window panel, comprising: a mold comprising a rolled, hydroformed, or stamped metal first mold half and a rolled, hydroformed, or stamped metal second mold half; a fluid bath configured to receive the mold; and a recirculating heater in flow communication with the fluid bath.

Clause 37: A casting assembly for casting a polymeric aircraft window panel, comprising: a plurality of molds, the molds comprising a rolled, hydroformed, or stamped metal first mold half and a rolled, hydroformed, or stamped metal second mold half; a heating chamber; and a plurality of conveyors extending through the heating chamber.

Clause 38: The casting assembly of clause 37, wherein the heating chamber is a reciprocating heating chamber.

Clause 39: A method of casting a polymeric aircraft window panel, comprising the steps of: injecting a polymer precursor liquid into a mold chamber of a mold comprising a first mold half comprising a first mold surface having a first shape, and a second mold half comprising a second mold surface having a second shape; and curing the polymer precursor liquid to form an aircraft window panel, wherein the aircraft window panel has a first surface corresponding to the first shape and a second surface corresponding to the second shape.

Clause 40: A method of casting a polymeric aircraft window panel, comprising the steps of: injecting a polymer precursor liquid into a mold chamber of a mold comprising a rolled, hydroformed, or stamped metal first mold half and a rolled, hydroformed, or stamped metal second mold half; and curing the polymer precursor liquid to form an aircraft window panel.

Clause 41: The method of clause 40, wherein the first mold half comprises a first mold surface having a first shape, the second mold half comprises a second mold surface having a second shape, and wherein the aircraft window panel has a first surface corresponding to the first shape and a second surface corresponding to the second shape.

Clause 42: The method of any of clauses 39 to 41, including injecting the polymer precursor liquid while the mold is at an inclined angle.

Clause 43: The method of clause 42, wherein the inclined angle is in the range of 0° to 45°.

Clause 44: The method of clauses 42 or 43, wherein the inclined angle is not greater than 30°.

Clause 45: The method of any of clauses 42 to 44, wherein the inclined angle is not greater than 20°.

Clause 46: The method of any of clauses 39 to 45, including injecting the polymer precursor liquid into the mold chamber while the mold is vertical and then placing the mold on its side during curing of the polymer precursor liquid.

Clause 47: The method of any of clauses 39 to 46, including locating the mold in a fluid bath, injecting the polymer precursor liquid into the mold chamber, and controlling a fluid level in the fluid bath to correspond to a precursor liquid level in the mold chamber.

Clause 48: The method of any of clauses 39 to 47, including locating the mold in a fluid bath, and controlling a temperature of the fluid in the fluid bath to selectively heat and/or cool the polymer precursor liquid in the mold.

Clause 49: The method of any of clauses 39 to 48, including injecting the polymer precursor liquid into the mold chamber, and transporting the mold on a conveyor through a stationary heating chamber.

Clause 50: The method of any of clauses 39 to 48, including injecting the polymer precursor liquid into the mold chamber, and moving a movable heating chamber with respect to the mold.

Clause 51: The method of any of clauses 39 to 50, including injecting the polymer precursor liquid into a bottom of the mold.

Clause 52: The method of any of clauses 39 to 51, wherein the first mold half comprises a first flange comprising a first gasket track, wherein the second mold half comprises a second flange comprising a second gasket track, wherein a gasket is located in the gasket tracks such that the first flange does not contact the second flange when the first mold half is mated to the second mold half.

Clause 53: The method of any of clauses 39 to 52, wherein the first mold half comprises a first flange comprising a first gasket track, wherein the second mold half comprises a second flange comprising a second gasket track, wherein a gasket is located in the gasket tracks, and wherein the method includes applying a clamping force directly over the aligned gasket tracks when the first mold half is mated to the second mold half.

Clause 54: The method of any of clauses 1 to 53, wherein the first mold half and the second mold half include an elastomeric back layer, and wherein the method includes placing the mold between two rigid supports such that the elastomeric back layers contact the supports.

Clause 55: A method of casting a polymeric aircraft window panel, comprising the steps of: connecting a rolled, hydroformed, or stamped metal first mold half and a rolled, hydroformed, or stamped metal second mold half to form a mold having a mold chamber; preheating the mold to a temperature in the range of 250° F. to 275° F.; optionally placing the mold at an inclined angle; optionally placing the mold in a fluid bath; injecting a polymer precursor liquid into the mold chamber; heating the mold to cure the polymer precursor liquid; cooling the mold; disconnecting the first and second mold halves; and removing the aircraft window panel.

Clause 56: A method of casting a polymeric aircraft window panel, comprising the steps of: connecting a first mold half and a second mold half to form a mold having a mold chamber, wherein first mold half comprises a first mold surface having a first shape and the second mold half comprises a second mold surface having a second shape; preheating the mold to a temperature in the range of 250° F. to 275° F.; optionally placing the mold at an inclined angle; optionally placing the mold in a fluid bath; injecting a polymer precursor liquid into the mold chamber; heating the mold to cure the polymer precursor liquid; cooling the mold; disconnecting the first and second mold halves; and removing the aircraft window panel, wherein the aircraft window panel has a first surface corresponding to the first shape and a second surface corresponding to the second shape.

Clause 57: The method of clauses 55 or 56, including applying a release agent to the first mold half and/or the second mold half.

Clause 58: The method of any of clauses 55 to 57, including removing excess flashing from the casting.

Clause 59: A method of casting a polymeric aircraft window panel, comprising the steps of: injecting a polymer precursor liquid into a mold chamber of a mold comprising a rolled, hydroformed, or stamped metal first mold half having a deformable first mold surface and a rolled, hydroformed, or stamped metal second mold half having a deformable second mold surface, wherein the first mold surface and second mold surface deform from a first shape before injection of a polymer precursor liquid into the mold to a second shape after injection of a polymer precursor liquid into the mold, and wherein the second shape conforms to a desired final shape of the window panel.

Clause 60: A method of casting a polymeric laminate, comprising the steps of: injecting a urethane polymer precursor liquid into a mold chamber of a mold comprising a polymeric first mold half and a polymeric second mold half; and curing the polymer precursor liquid to form a laminated structure.

Clause 61: The method of clause 60, wherein the first mold half and second mold half comprise polycarbonate material and/or polyurethane material.

It will be readily appreciated by those skilled in the art that modifications may be made to the invention without departing from the concepts disclosed in the foregoing description. Accordingly, the particular aspects described in detail herein are illustrative only and are not limiting to the invention which is to be given the full breadth of the appended claims and any and all equivalents thereof.

What is claimed is:

1. A mold for casting, from a polymer precursor liquid, a polymeric aircraft window panel, the panel comprising a central viewing portion having a curved first and/or second surface and a peripheral edge shaped for engagement with a framework of an aircraft to hold the aircraft window panel in place during operation of the aircraft, the mold comprising:
   a first mold half comprising a first mold surface;
   a second mold half comprising a second mold surface;
   a glass liner removably located over the first mold surface and/or the second mold surface, and
   at least one shaped gasket comprising (i) an inner end positioned between a peripheral edge of the first mold half and a peripheral edge of the second mold half and (ii) an outer end positioned outward from the peripheral edges of the mold halves, the inner end comprising a rabbited or stepped surface shaped to form a rabbited or stepped edge for at least a portion of the peripheral edge of the panel,
   wherein the first mold surface and/or the second mold surface are capable of conforming to a final shape for opposed major surfaces of the aircraft window panel including the central viewing portion and the peripheral edge of the panel, and
   wherein an outwardly facing surface of the glass liner has a shape complementary to a shape of the first mold surface or the second mold surface.

2. The mold of claim 1, wherein the first mold half and/or the second mold half comprise rolled, hydroformed, or stamped metal sheets.

3. The mold of claim 1, wherein the first mold surface and/or the second mold surface comprise rolled, hydroformed, or stamped metal sheets.

4. The mold of claim 1, wherein the first mold half and/or the second mold half comprise stainless steel or aluminum.

5. The mold of claim 1, wherein the first mold surface and/or the second mold surface include a patterned region.

6. The mold of claim 1, wherein the first mold half comprises a first mold surface, the second mold half comprises a second mold surface, and the first mold surface and/or the second mold surface have a surface roughness not greater than 10 nm.

7. The mold of claim 1, wherein the first mold half comprises a first flange having a peripheral edge, wherein the second mold half comprises a second flange having a peripheral edge, and wherein the first flange and the second flange are free of gasket tracks.

8. The mold of claim 1, wherein the inner end of the at least one shaped gasket further comprises a pair of opposed groves near the outer end and a pair of opposed flat surfaces near the rabbited or stepped surface of the inner end.

9. The mold of claim 8, wherein the peripheral edge of the first mold half engages one of the grooves and the peripheral edge of the second mold half engages the other groove.

10. The mold of claim 8, wherein a width of the outer end of the shaped gasket is greater than a width of the inner end of the shaped gasket.

11. The mold of claim 8, including a plurality of clamps, wherein the clamps are configured to apply a clamping force on the first mold half and second mold half over the flat surfaces.

12. The mold of claim 1, wherein the glass liner comprises thermally tempered or chemically tempered glass, and wherein the glass liner is from 0.5 mm to 2 mm thick.

13. The mold of claim 1, further comprising a coating over an inwardly facing surface of the glass liner configured to facilitate removal of the aircraft window panel after curing, the coating comprising a sputter deposited coating comprising steel and/or nickel.

14. The mold of claim 1, wherein the shape of the first mold surface and/or the second mold surface comprises a surface contour corresponding to a curvature of the central viewing portion of the aircraft window panel and an edge contour corresponding to the peripheral portion of the aircraft window panel.

15. The mold of claim 1, further comprising an inlet defined by the first mold half and/or the second mold half configured to permit the polymer precursor liquid to be injected into a mold cavity defined by the first mold half and the second mold half.

16. The mold of claim 1, wherein the first mold surface and/or the second mold surface are configured to deform from an initial shape, in which the first and/or second mold surfaces do not conform to the final shape for the opposed major surfaces of the aircraft window panel, to a shape conforming to the final shape of the panel due to hydrostatic pressure produced from injection of the polymer precursor liquid into a mold cavity defined by the first mold half and the second mold half.

17. The mold of claim 1, wherein the rabbited or stepped surface of the inner end of the at least one shaped gasket comprises at least one angled surface that is angled relative to the first mold surface and/or the second mold surface by less than 90 degrees.

18. The mold of claim 1, wherein the rabbited or stepped surface of the inner end of the at least one shaped gasket comprises:
   a first angled surface,
   a second angled surface, and
   a flat surface between the first angled surface and the second angled surface, wherein the first and the second angled surfaces are angled relative to the first mold surface and/or the second mold surface by less than 90 degrees, and the flat surface is parallel to the first mold surface and/or the second mold surface.

19. The mold of claim 1, wherein the at least one shaped gasket comprises a first shaped gasket and a second shaped gasket located between the first mold half and the second mold half, the mold further comprising a flexible or rigid web extending into a cavity of the mold defined by the first mold half and the second mold half and held in place between the first shaped gasket and the second shaped gasket.

20. A method of casting a polymeric aircraft window panel, comprising the steps of:
   injecting a polymer precursor liquid into a mold chamber of the mold of claim 1; and
   curing the polymer precursor liquid to form the aircraft window panel,
   wherein the first surface of the aircraft window panel corresponds to the shape of the first mold surface and the second surface of the aircraft window panel corresponds to the shape of the second mold surface.

\* \* \* \* \*